(12) United States Patent
Yang et al.

(10) Patent No.: US 12,250,685 B2
(45) Date of Patent: Mar. 11, 2025

(54) INDICATION OF DEMODULATION REFERENCE SIGNAL BUNDLING

(71) Applicant: QUALCOMM Incorporated, San Diego, CA (US)

(72) Inventors: Wei Yang, San Diego, CA (US); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/457,144

(22) Filed: Dec. 1, 2021

(65) Prior Publication Data
US 2022/0240287 A1    Jul. 28, 2022

Related U.S. Application Data

(60) Provisional application No. 63/199,787, filed on Jan. 25, 2021.

(51) Int. Cl.
| | |
|---|---|
| *H04W 72/21* | (2023.01) |
| *H04L 1/1812* | (2023.01) |
| *H04L 5/00* | (2006.01) |
| *H04W 72/1268* | (2023.01) |
| *H04W 72/566* | (2023.01) |

(52) U.S. Cl.
CPC .......... *H04W 72/21* (2023.01); *H04L 1/1812* (2013.01); *H04L 5/0051* (2013.01); *H04W 72/1268* (2013.01); *H04W 72/566* (2023.01)

(58) Field of Classification Search
CPC  H04W 72/21; H04W 72/1268; H04W 72/566
See application file for complete search history.

(56) References Cited

U.S. PATENT DOCUMENTS

| | | | |
|---|---|---|---|
| 11,979,259 B2* | 5/2024 | Ly | H04L 5/0051 |
| 2020/0403768 A1* | 12/2020 | Manolakos | H04L 25/0224 |
| 2021/0014095 A1* | 1/2021 | Ly | H04W 72/23 |
| 2022/0225240 A1* | 7/2022 | Fakoorian | H04W 72/21 |
| 2023/0254865 A1* | 8/2023 | Lidian | H04W 72/541 |
| | | | 370/329 |

OTHER PUBLICATIONS

R1-2101479 Qualcomm "Joint channel estimation for PUSCH" 3GPP #104e Jan. 25-Feb. 5, 2021 (Year: 2021).*

* cited by examiner

*Primary Examiner* — Basil Ma
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may encode an indication for demodulation reference signal bundling in a physical uplink shared channel (PUSCH) communication based at least in part on whether uplink control information (UCI) other than the indication is to be included in the PUSCH communication. The UE may transmit the PUSCH communication. Numerous other aspects are described.

29 Claims, 18 Drawing Sheets

INDICATION OF DEMODULATION REFERENCE SIGNAL BUNDLING

CROSS-REFERENCE TO RELATED APPLICATION

This Patent application claims priority to U.S. Provisional Patent Application No. 63/199,787, filed on Jan. 25, 2021, entitled "INDICATION OF CROSS-SLOT CHANNEL ESTIMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating demodulation reference signal bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes encoding an indication for demodulation reference signal (DMRS) bundling in a physical uplink shared channel (PUSCH) communication based at least in part on whether uplink control information (UCI) other than the indication is to be included in the PUSCH communication, and transmitting the PUSCH communication.

In some aspects, a method of wireless communication performed by a base station includes receiving, from a UE in a PUSCH communication, an encoded indication for DMRS bundling and an encoded UCI for a UCI other than the indication, decoding the encoded indication and the encoded UCI to obtain the indication and the UCI, and transmitting a downlink communication based at least in part on one or more channel estimates obtained from using the indication to perform DMRS bundling.

In some aspects, a method of wireless communication performed by a UE includes encoding an indication for DMRS bundling in a PUSCH communication based at least in part on whether the indication references a future PUSCH communication or a past PUSCH communication, and transmitting the PUSCH communication.

In some aspects, a method of wireless communication performed by a base station includes receiving, from a UE in a PUSCH communication, an encoded indication for DMRS bundling, decoding the encoded indication from a start of the PUSCH communication or an end of the PUSCH communication to obtain an indication for DMRS bundling, and transmitting a downlink communication based at least in part on one or more channel estimates that are obtained by using the indication to perform DMRS bundling.

In some aspects, a method of wireless communication performed by a UE includes encoding an indication for DMRS bundling in a PUSCH communication and transmitting the PUSCH communication using a non-coherent sequence.

In some aspects, a method of wireless communication performed by a base station includes receiving, from a UE in a PUSCH communication with a noncoherent sequence, an encoded indication for DMRS bundling, decoding the encoded indication, without performing channel estimation for the PUSCH communication, to obtain an indication for DMRS bundling, and transmitting a downlink communication based at least in part on one or more channel estimates that are obtained by using the indication to perform DMRS bundling.

In some aspects, a UE for wireless communication includes a memory and one or more processors coupled to the memory, the one or more processors configured to encode an indication for DMRS bundling in a PUSCH communication based at least in part on whether UCI other than the indication is to be included in the PUSCH communication, and transmit the PUSCH communication.

In some aspects, a base station for wireless communication includes a memory and one or more processors coupled to the memory, the one or more processors configured to receive, from a UE in a PUSCH communication, an encoded indication for DMRS bundling and an encoded UCI for a UCI other than the indication, decode the encoded indication and the encoded UCI to obtain the indication and the UCI, and transmit a downlink communication based at least in part on one or more channel estimates obtained from using the indication to perform DMRS bundling.

In some aspects, a UE for wireless communication includes a memory and one or more processors coupled to the memory, the one or more processors configured to encode an indication for DMRS bundling in a PUSCH communication based at least in part on whether the indication references a future PUSCH communication or a past PUSCH communication, and transmit the PUSCH communication.

In some aspects, a base station for wireless communication includes a memory and one or more processors coupled to the memory, the one or more processors configured to receive, from a UE in a PUSCH communication, an encoded indication for DMRS bundling, decode the encoded indication from a start of the PUSCH communication or an end of the PUSCH communication to obtain an indication for DMRS bundling, and transmit a downlink communication based at least in part on one or more channel estimates that are obtained by using the indication to perform DMRS bundling.

In some aspects, a UE for wireless communication includes a memory and one or more processors coupled to the memory, the one or more processors configured to encode an indication for DMRS bundling in a PUSCH communication and transmit the PUSCH communication using a non-coherent sequence.

In some aspects, a base station for wireless communication includes a memory and one or more processors coupled to the memory, the one or more processors configured to receive, from a UE in a PUSCH communication with a noncoherent sequence, an encoded indication for DMRS bundling, decode the encoded indication, without performing channel estimation for the PUSCH communication, to obtain an indication for DMRS bundling, and transmit a downlink communication based at least in part on one or more channel estimates that are obtained by using the indication to perform DMRS bundling.

In some aspects, a non-transitory computer-readable medium storing a set of instructions for wireless communication includes one or more instructions that, when executed by one or more processors of a UE, cause the UE to encode an indication for DMRS bundling in a PUSCH communication based at least in part on whether UCI other than the indication is to be included in the PUSCH communication, and transmit the PUSCH communication.

In some aspects, a non-transitory computer-readable medium storing a set of instructions for wireless communication includes one or more instructions that, when executed by one or more processors of a base station, cause the base station to receive, from a UE in a PUSCH communication, an encoded indication for DMRS bundling and an encoded UCI for a UCI other than the indication, decode the encoded indication and the encoded UCI to obtain the indication and the UCI, and transmit a downlink communication based at least in part on one or more channel estimates obtained from using the indication to perform DMRS bundling.

In some aspects, a non-transitory computer-readable medium storing a set of instructions for wireless communication includes one or more instructions that, when executed by one or more processors of a UE, cause the UE to encode an indication for DMRS bundling in a PUSCH communication based at least in part on whether the indication references a future PUSCH communication or a past PUSCH communication, and transmit the PUSCH communication.

In some aspects, a non-transitory computer-readable medium storing a set of instructions for wireless communication includes one or more instructions that, when executed by one or more processors of a base station, cause the base station to receive, from a UE in a PUSCH communication, an encoded indication for DMRS bundling, decode the encoded indication from a start of the PUSCH communication or an end of the PUSCH communication to obtain an indication for DMRS bundling, and transmit a downlink communication based at least in part on one or more channel estimates that are obtained by using the indication to perform DMRS bundling.

In some aspects, a non-transitory computer-readable medium storing a set of instructions for wireless communication includes one or more instructions that, when executed by one or more processors of a UE, cause the UE to encode an indication for DMRS bundling in a PUSCH communication, and transmit the PUSCH communication using a non-coherent sequence.

In some aspects, a non-transitory computer-readable medium storing a set of instructions for wireless communication includes one or more instructions that, when executed by one or more processors of a base station, cause the base station to receive, from a UE in a PUSCH communication with a noncoherent sequence, an encoded indication for DMRS bundling, decode the encoded indication, without performing channel estimation for the PUSCH communication, to obtain an indication for DMRS bundling, and transmit a downlink communication based at least in part on one or more channel estimates that are obtained by using the indication to perform DMRS bundling.

In some aspects, an apparatus for wireless communication includes means for encoding an indication for DMRS bundling in a PUSCH communication based at least in part on whether UCI other than the indication is to be included in the PUSCH communication, and means for transmitting the PUSCH communication.

In some aspects, an apparatus for wireless communication includes means for receiving, from a UE in a PUSCH communication, an encoded indication for DMRS bundling and an encoded UCI for a UCI other than the indication, means for decoding the encoded indication and the encoded UCI to obtain the indication and the UCI, and means for transmitting a downlink communication based at least in part on one or more channel estimates obtained from using the indication to perform DMRS bundling.

In some aspects, an apparatus for wireless communication includes means for encoding an indication for DMRS bundling in a PUSCH communication based at least in part on whether the indication references a future PUSCH communication or a past PUSCH communication, and means for transmitting the PUSCH communication.

In some aspects, an apparatus for wireless communication includes means for receiving, from a UE in a PUSCH communication, an encoded indication for DMRS bundling, means for decoding the encoded indication from a start of the PUSCH communication or an end of the PUSCH communication to obtain an indication for DMRS bundling, and means for transmitting a downlink communication based at least in part on one or more channel estimates that are obtained by using the indication to perform DMRS bundling.

In some aspects, an apparatus for wireless communication includes means for encoding an indication for DMRS bundling in a PUSCH communication and means for transmitting the PUSCH communication using a non-coherent sequence.

In some aspects, an apparatus for wireless communication includes means for receiving, from a UE in a PUSCH communication with a noncoherent sequence, an encoded indication for DMRS bundling, means for decoding the encoded indication, without performing channel estimation for the PUSCH communication, to obtain an indication for DMRS bundling, and means for transmitting a downlink communication based at least in part on one or more channel estimates that are obtained by using the indication to perform DMRS bundling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
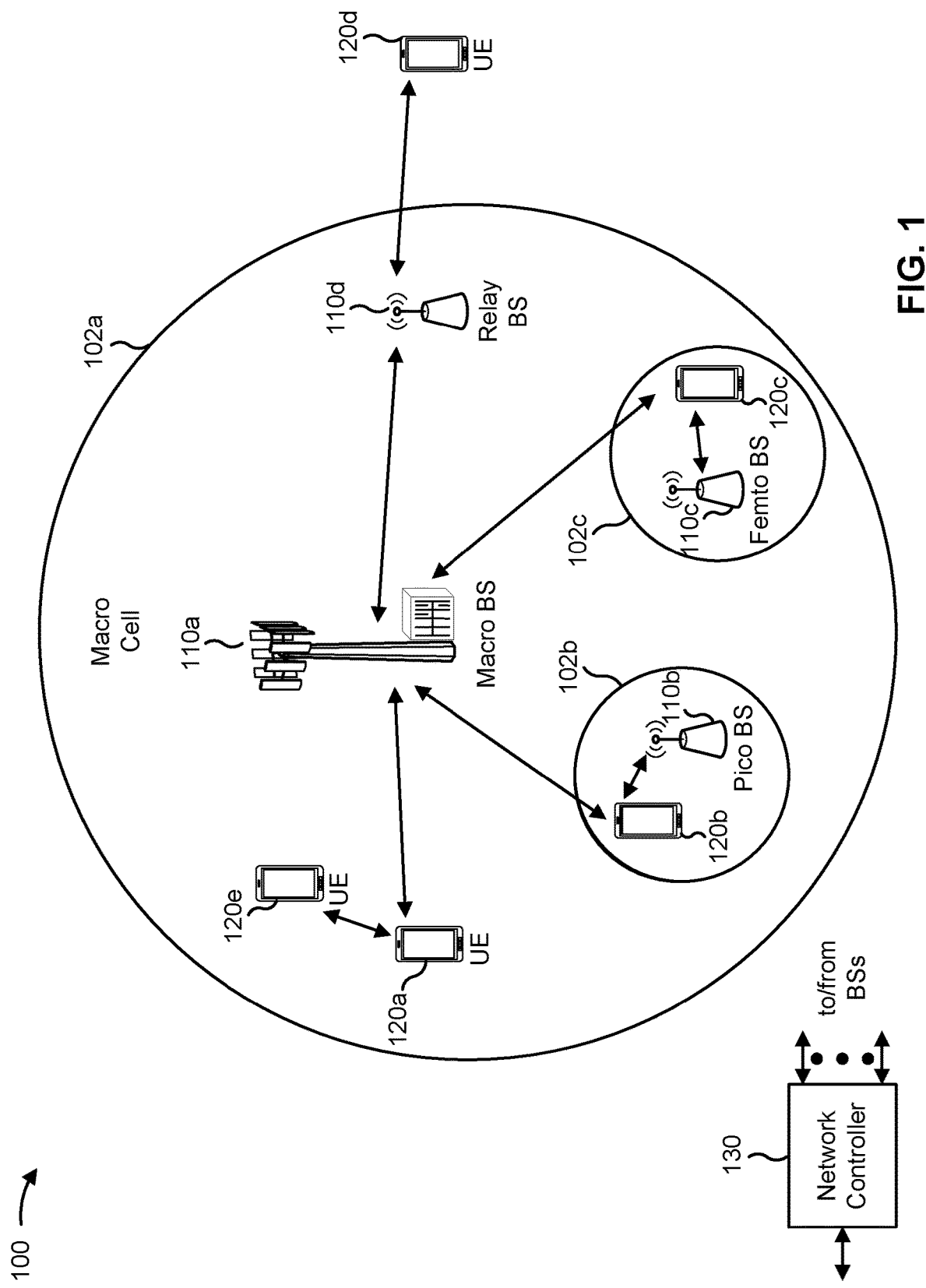
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
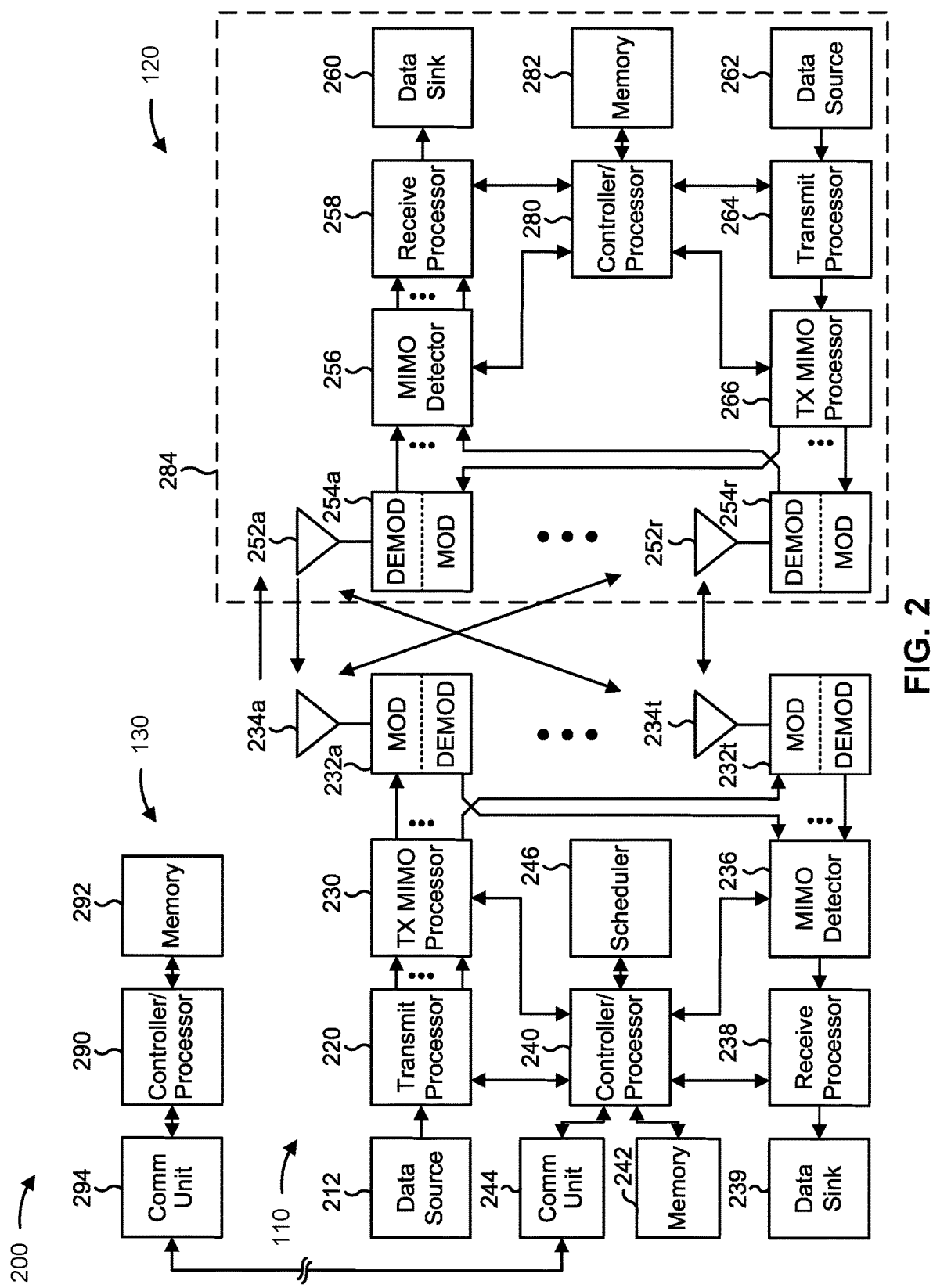
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-18).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-18).

Controller/processor 240 of base station 110, controller/processor 280 of UE 120, and/or any other component(s) of FIG. 2 may perform one or more techniques associated with indicating demodulation reference signal (DMRS) bundling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for encoding an indication for DMRS bundling in a physical uplink shared channel (PUSCH) communication based at least in part on whether uplink control information (UCI) other than the indication is to be included in the PUSCH communication, and/or means for transmitting the PUSCH communication. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for encoding the indication in the PUSCH communication if the UCI is not to be included in the PUSCH communication, and/or means for encoding the UCI in the PUSCH communication without encoding the indication if the UCI is to be included in the PUSCH communication.

In some aspects, base station 110 includes means for receiving, from a UE in a PUSCH communication, an encoded indication for DMRS bundling and an encoded UCI for a UCI other than the indication, means for decoding the encoded indication and the encoded UCI to obtain the indication and the UCI, and/or means for transmitting a downlink communication based at least in part on one or more channel estimates obtained from using the indication to perform DMRS bundling. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for separately decoding an encoded channel state information in the PUSCH communication.

In some aspects, UE 120 includes means for encoding an indication for DMRS bundling in a PUSCH communication based at least in part on whether the indication references a future PUSCH communication or a past PUSCH communication, and/or means for transmitting the PUSCH communication. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for determining that the indication references a future PUSCH communication, where the encoding includes mapping the indication to an end of the PUSCH communication.

In some aspects, UE 120 includes means for determining that the indication references a past PUSCH communication, where the encoding includes mapping the indication to a start of the PUSCH communication.

In some aspects, base station 110 includes means for receiving, from a UE in a PUSCH communication, an encoded indication for DMRS bundling, means for decoding the encoded indication from a start of the PUSCH communication or an end of the PUSCH communication to obtain an indication for DMRS bundling, and/or means for transmitting a downlink communication based at least in part on one or more channel estimates that are obtained by using the indication to perform DMRS bundling. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, UE 120 includes means for encoding an indication for DMRS bundling in a PUSCH communication, and/or means for transmitting the PUSCH communication using a non-coherent sequence. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, base station 110 includes means for receiving, from a UE in a PUSCH communication with a noncoherent sequence, an encoded indication for DMRS bundling, means for decoding the encoded indication, without performing channel estimation for the PUSCH communication, to obtain an indication for DMRS bundling, and/or means for transmitting a downlink communication based at least in part on one or more channel estimates that are obtained by using the indication to perform DMRS bundling. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Uplink channels and uplink reference signals may carry information from a UE to a base station. An uplink channel may include a physical uplink control channel (PUCCH) that carries UCI, a PUSCH that carries uplink data, or a physical random access channel (PRACH) used for initial network access, among other examples. An uplink reference signal may include a sounding reference signal (SRS), a DMRS, or a phase tracking reference signal (PTRS), among other examples.

An SRS may carry information used for uplink channel estimation, which may be used for scheduling, link adaptation, precoder selection, or beam management, among other examples. A base station may configure one or more SRS resource sets for a UE, and the UE may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station may measure the SRSs, may perform channel estimation based at least in part on the measurements, and the base station may use the SRS measurements to configure communications with the UE.

A DMRS may carry information used to estimate a radio channel for demodulation of an associated physical channel (e.g., PUCCH or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs may be used for both downlink communications and uplink communications.

Figure 3:
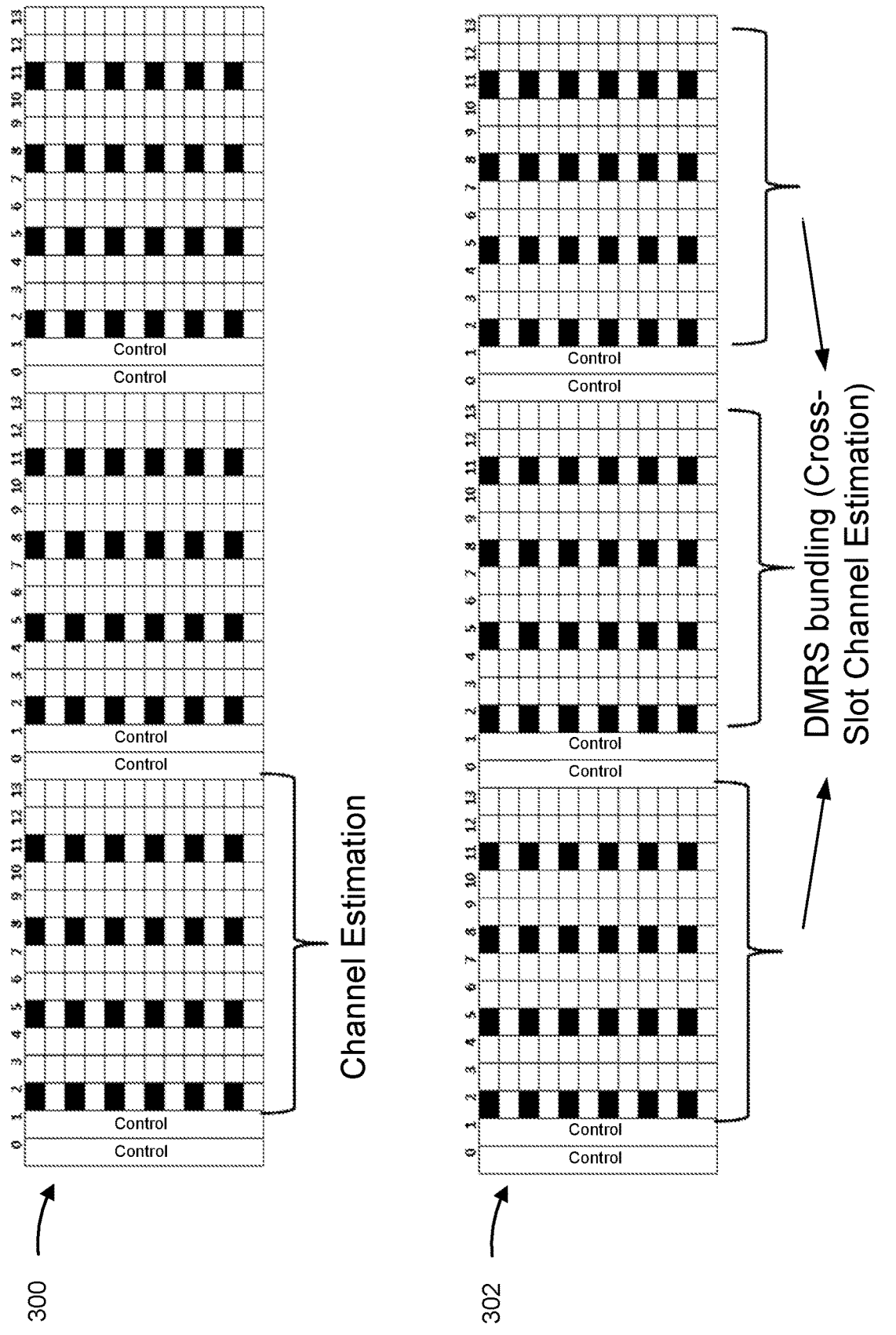
FIG. 3 is a diagram illustrating examples of channel estimation, in accordance with the present disclosure.

FIG. 3 is a diagram illustrating examples 300 and 302 of channel estimation, in accordance with the present disclosure.

Example 300 shows three slots of transport blocks. A receiving UE (or a receiving base station) may use DMRSs in each transport block for channel estimation. That is, channel estimation is performed for each time instance (e.g., slot), separately. Example 302 shows joint channel estimation, using DMRSs of the three transport blocks together. This may be referred to as "cross-slot channel estimation," "DMRS bundling," or "joint channel estimation." DMRS bundling may improve the accuracy of channel estimation, because the estimates involve information across multiple slots.

As indicated above, FIG. 3 provides some examples. Other examples may differ from what is described with regard to FIG. 3.

Figure 4:
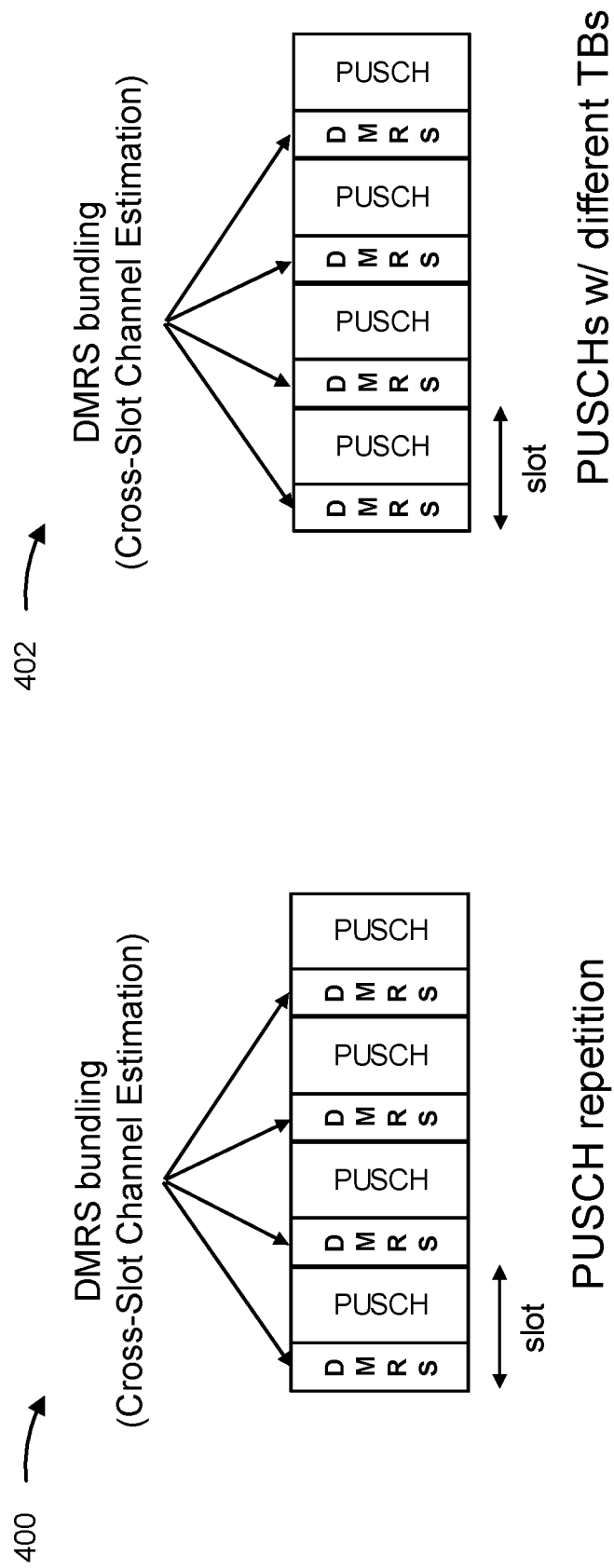
FIG. 4 is a diagram illustrating examples of slots for demodulation reference signal (DMRS) bundling, in accordance with the present disclosure.

FIG. 4 is a diagram illustrating examples 400 and 402 of slots for DMRS bundling, in accordance with the present disclosure.

In order for DMRS bundling to be effective, DMRSs across the slots are to maintain phase continuity. In other words, DMRSs of the same channel estimation process are to have phase coherence from slot to slot. Phase coherence may include phase continuity in the frequency domain across consecutive slots. Signals may have a same phase if the signals have the same frequency, and the maxima and minima of the signals are aligned. Signals may be phase coherent if a phase difference between the signals is the same. Maintaining phase continuity may also be referred to as "coherent transmission."

The DMRSs in examples 400 and 402 may be for consecutive slots of physical uplink channels, such as for PUSCH DMRSs or PUCCH DMRSs. Consecutive slots may be contiguous slots, such as shown by examples 400 and 402. DMRS bundling may be performed for repetitions of physical uplink channels or for repetitions of SRSs, as shown by example 400. DMRS bundling may also be performed for physical uplink channels carrying different transport blocks, as shown by example 402.

As indicated above, FIG. 4 provides some examples. Other examples may differ from what is described with regard to FIG. 4.

Figure 5:
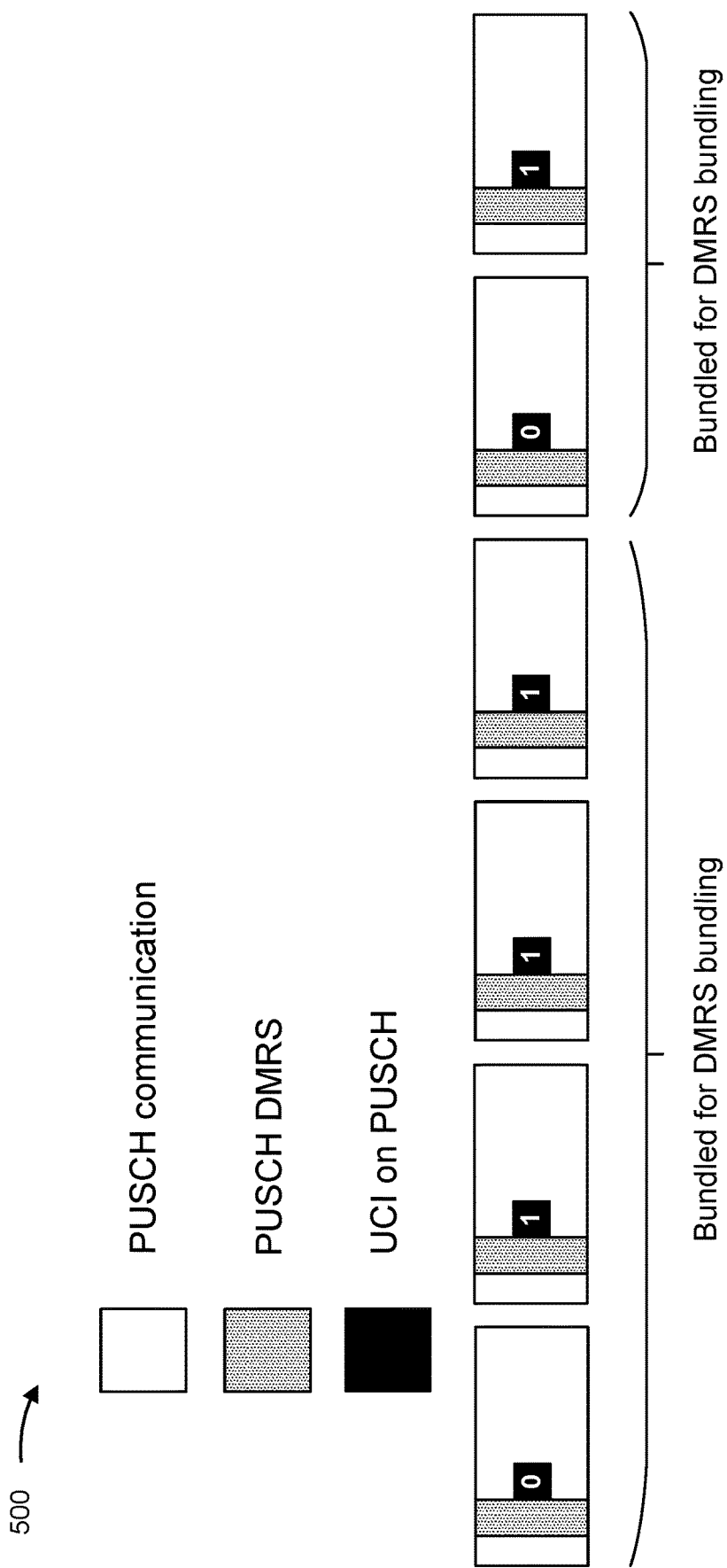
FIG. 5 is a diagram illustrating an example of physical uplink shared channel communications with uplink control information, in accordance with the present disclosure.

FIG. 5 is a diagram illustrating an example 500 of PUSCH communications with UCI, in accordance with the present disclosure. Example 500 shows multiple PUSCH communications with DMRSs. Some PUSCH communications may be bundled together to support DMRS bundling by a base station. The PUSCH communications in example 500 may include UCI with an indication of whether a PUSCH communication is bundled with other PUSCH communications. The indications are shown as "0" or "1" in UCI, with "1" indicating that a PUSCH communication is bundled. The UE may indicate DMRS bundling by other means. For example, instead of using "0" and "1", the UE may use the same indication on two consecutive transmissions if they are bundled, and use different indications if the two transmissions are not bundled. For example, a sequence of (0, 1, 1, 1, 0, 0, 0, 0, 0, 1, 1) may indicate groups of bundling such as [0], [1, 1, 1], [0, 0, 0, 0, 0], and [1, 1].

A UE may decide whether to bundle DMRSs of multiple PUSCH communications for DMRS bundling performed by a base station. However, the base station may not know whether DMRSs of PUSCH communications are bundled. Uplink transmit power control may depend on path loss measurements, and if the path loss changes, the transmit power for a PUSCH communication changes. This may affect a phase of the PUSCH communication, which may cause phase incoherence across PUSCH communications. DMRS bundling may not be appropriate, but the base station may not be aware that PUSCH communications are not bundled. In some scenarios, the UE may provide an indication in UCI to the base station of whether a PUSCH communication is bundled (e.g., indication for DMRS bundling). The PUSCH communication may be bundled with past or future PUSCH communications. However, if there is other UCI, such as hybrid automatic repeat request (HARQ) feedback, the PUSCH communication may not include the indication of DMRS bundling. If the indication is not included, but should be included, the base station may not obtain accurate channel estimates. If the indication is included but has a lower priority, the other UCI may not be encoded and thus important feedback or control information may be lost. Such uncertainty for including the indication when other UCI is present in a PUSCH communication may degrade communications. Degraded communications may cause the UE and the base station to waste time, power, processing resources, and signaling resources.

According to various aspects described herein, a UE may determine whether to include an indication of DMRS bundling in a PUSCH communication when the PUSCH communication is to include other UCI (e.g., HARQ acknowledgement (ACK)). In some aspects, if UCI other than the indication is to be included in the PUSCH communication, the UE may separately encode the indication and separately encode the other UCI. Alternatively, in some aspects, the UE may jointly encode the indication and the other UCI. In other words, the UE may select when and how to encode the indication when other UCI is to be included. The UE may make these determinations based at least in part on one or more factors, such as priority levels of the other UCI and data for the PUSCH communication. By determining when and how to appropriately encode the indication in the PUSCH communication when other UCI is to be included, the UE may avoid degraded communications due to inaccurate channel estimates or the loss of the indication, the other UCI, or data of the PUSCH communication. As a result, the UE may conserve processing resources and signaling resources.

As indicated above, FIG. 5 is provided as an example. Other examples may differ from what is described with regard to FIG. 5.

Figure 6:
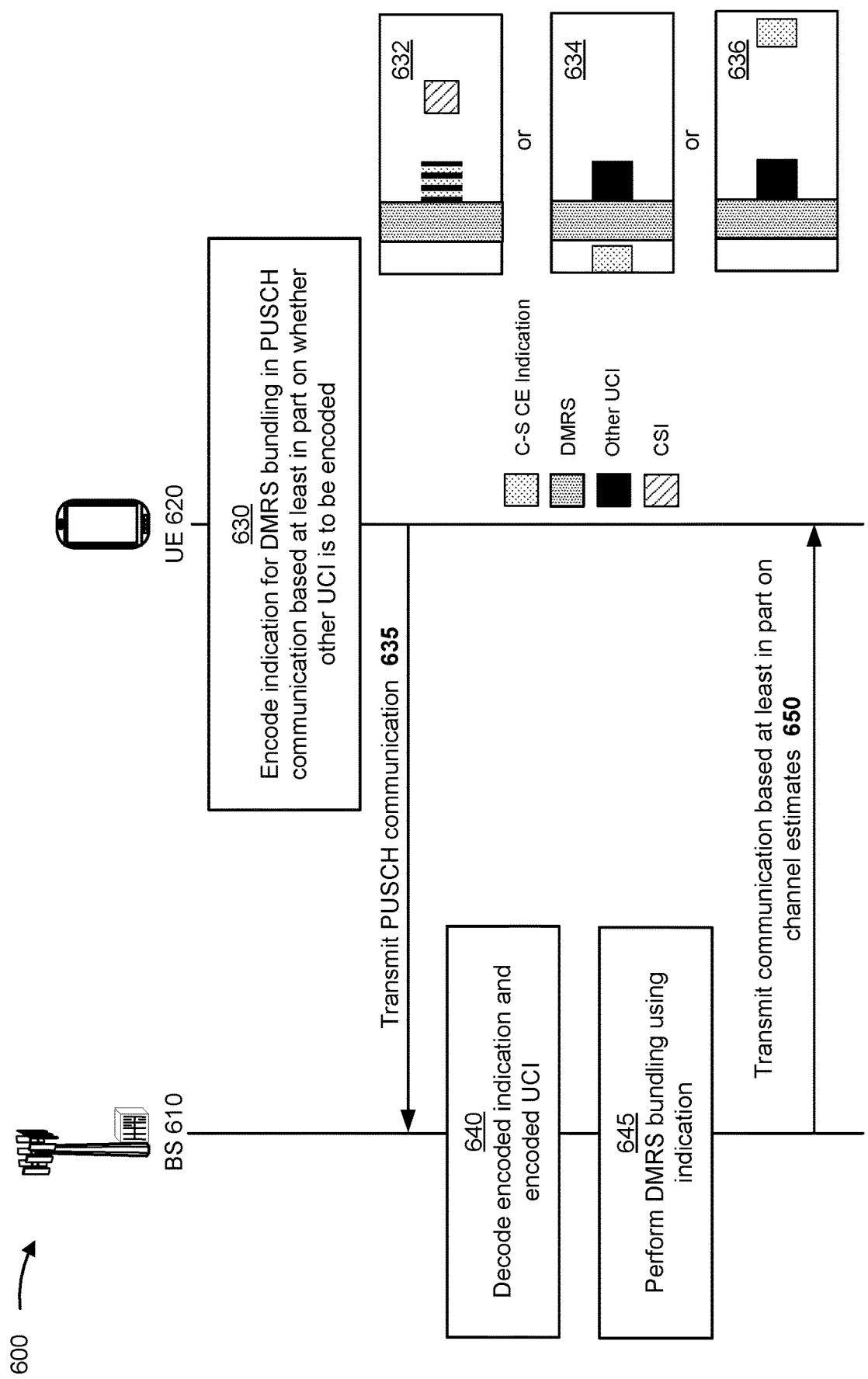
FIG. 6 is a diagram illustrating an example of indicating cross-slot channel estimation, in accordance with the present disclosure.

FIG. 6 is a diagram illustrating an example 600 of indicating DMRS bundling, in accordance with the present disclosure. As shown in FIG. 6, a BS 610 (e.g., BS 110 depicted in FIGS. 1-2) may communicate (e.g., transmit an uplink transmission and/or receive a downlink transmission) with a mobile station, such as UE 620 (e.g., UE 120 depicted in FIGS. 1-2). UE 620 and BS 610 may be part of a wireless network (e.g., wireless network 100).

A PUSCH communication may include DMRSs that may be used for channel estimation. UE 620 may encode an indication for DMRS bundling and include ("piggyback") the encoded indication with other UCI in the PUSCH communication. UE 620 may determine when and how to encode the indication if other UCI is to be included in the PUSCH communication. For example, as shown by reference number 630, UE 620 may encode the indication of a PUSCH communication based at least in part on whether other UCI is to be encoded in the PUSCH communication. In some aspects, the indication and the other UCI may be jointly encoded if the other UCI is to be included in the PUSCH communication. PUSCH communication 632 shows a DMRS and the indication jointly encoded with the other UCI. The other UCI may include HARQ feedback, such as a HARQ-ACK. If CSI is to be included in PUSCH communication 632, UE 620 may encode the CSI separate from the joint encoding of the indication and the other UCI (e.g., HARQ-ACK). This may include encoding CSI part 1 and part 2. If only CSI is contained in the PUSCH communication (no other UCI), the UE may separately encode the indication and the CSI.

In some aspects, the indication and the other UCI may be separately encoded if the other UCI is to be included, as shown by PUSCH communication 634. For example, the UE may use a first encoder to encode the indication and a second encoder to encode the other UCI (e.g., HARQ-ACK). The encoded indication may puncture data (or CSI if CSI is mapped to resource elements for the indication) to eliminate extra steps for decoding or other decoding overhead, where the puncturing includes removing data or CSI symbols. Because BS 610 may not know ahead of time whether the DMRS on PUSCH communication 634 is bundled with other PUSCH communications, separately encoding the indication may enable BS 610 to decode the indication (e.g., 1 bit) first, using only the DMRS in current PUSCH communication 634. After decoding the indication, BS 610 may re-perform channel estimation using the DMRS in PUSCH communication 634, as well as DMRS in past PUSCH communications (if indicated). BS 610 may decode other UCIs using the new channel estimate.

In some aspects, the indication may be at a start of PUSCH communication 634. For example, the encoded indication may be in the first symbol of PUSCH communication 634, or at least in the first non-DMRS symbol if the encoded indication is greater than 1 bit. This may be referred to as a "Mode 2 backward indication" for bundled PUSCH communications and may be useful for indicating that past PUSCH communications are bundled with PUSCH communication 634. In this way, the indication may be decoded before the DMRS of PUSCH communication 634 such that the DMRS of PUSCH communication 634 is jointly processed with past DMRS for DMRS bundling. Note that HARQ feedback may normally mapped to a first symbol after a first DMRS symbol, leaving the start of a PUSCH communication available for the indication.

PUSCH communication 636 shows the encoded indication at an end of PUSCH communication 636. The encoded indication may be in, or at least in, a last symbol of PUSCH communication 636. This may be referred to as a "Mode 1 forward indication" for bundled PUSCH communications and may be for indicating that future PUSCH communications are bundled with the DMRS of PUSCH communication 636.

In some aspects, UE 620 may determine to not encode the indication in a PUSCH communication if other UCI is to be included in the PUSCH communication. UE 620 may encode the indication in the PUSCH communication is no other UCI is to be included. That is, if other UCI is to be included in the PUSCH communication, UE 620 may drop the indication.

If the indication and the other UCI are separately encoded, UE 620 may follow an order for when the indication for DMRS bundling and the other UCI are encoded and mapped to the PUSCH communication. For example, UE 620 may map the indication before mapping the other UCI. Conversely, UE 620 may map the other UCI before mapping the indication. If CSI is involved, UE 620 may map the other UCI (e.g., HARQ-ACK), the indication, and then the CSI. UE 620 may also map the HARQ-ACK, CSI part 1, the indication, and then CSI part 2 (if any). UE 620 may follow other ordered combinations. UE 620 may consider, as part of the ordering, if resources on the PUSCH communication allocated for transmitting UCI are smaller than a total amount of resources required for mapping all the UCIs, including the indication. UE 620 may prioritize the UCIs that are mapped first to the PUSCH communication over UCIs that are mapped later. That is, UE 620 may follow a priority order that accounts for different type of UCIs in the PUSCH communication.

UE 620 may determine whether (and how) to include the indication for DMRS bundling with other UCI in a PUSCH communication based at least in part on one or more factors. For example, UE 620 may make such a determination based at least in part on a priority level of data of the PUSCH communication, a priority level of the other UCI, and/or a priority level of the indication. There may be multiple levels of priority, including a low priority and a high priority. If two uplink communications collide in a time resource, UE 620 may use a priority index (e.g., "0" for low priority, "1" for high priority) to determine which communication is dropped. Note that low priority HARQ feedback may be multiplexed with high priority HARQ feedback and included in the PUSCH communication, instead of always dropping low priority HARQ feedback.

In some aspects, UE 620 may consider the indication for DMRS bundling to have a same priority level as the data of the PUSCH communication. Accordingly, if a high priority UCI, such as a high priority HARQ-ACK, is to be multiplexed with low priority data of the PUSCH communication, UE 620 may prioritize the HARQ-ACK over the indication and drop the indication. If a low priority HARQ-ACK is to be multiplexed with high priority data of the PUSCH, then UE 620 may multiplex both the indication and the low priority HARQ-ACK on the PUSCH communication, either jointly encoded or separately encoded. UE 620 may use joint encoding if the HARQ-ACK has a same priority as the data and the indication, and use separate encoding if the data and the indication have a greater priority than the HARQ-ACK.

As shown by reference number 635, UE 620 may transmit the PUSCH communication to BS 610. As shown by reference number 640, BS 610 may decode an encoded indication and an encoded UCI. As shown by reference number 645, BS 610 may perform DMRS bundling using the indication. BS 610 may determine which DMRSs are bundled for DMRS bundling. In some aspects, BS 610 may perform some channel estimation, decode the indication, and then perform more channel estimation based at least in part on the indication. As shown by reference number 650, BS 610 may transmit a downlink communication based at least in part on one or more channel estimates obtained from the DMRS bundling.

The indication of DMRS bundling may impact the channel estimation scheme that is employed by BS 610 across PUSCH communications, including whether DMRS bundling or separate channel estimation is performed. In some aspects, UE 620 may transmit the indication using a noncoherent sequence on the PUSCH, which can be decoded without performing channel estimation. In NR, UCI and PUSCH data are transmitted using a certain modulation scheme. The modulation scheme may specify how bits are mapped. Information associated with the modulation scheme may not be decoded until after channel estimation is performed with the DMRS. A coherent scheme may require BS 610 to know a phase of the PUSCH and use phases of a received signal to convey information (e.g., bits 1 and 0 may be mapped to [−1,−1] vs [+1,+1]). A noncoherent scheme may not require BS 610 to know a phase of the PUSCH (e.g., bits 1 and 0 mapped to [+1,+1] and [+1,−1]. In other words, if UE 620 uses a noncoherent sequence to transmit the indication, B S 610 may decode the indication without knowing the phase of the PUSCH and without performing channel estimation. As a result, BS 610 may save time, processing resources, and signaling resources.

As indicated above, FIG. 6 is provided as an example. Other examples may differ from what is described with regard to FIG. 6.

Figure 7:
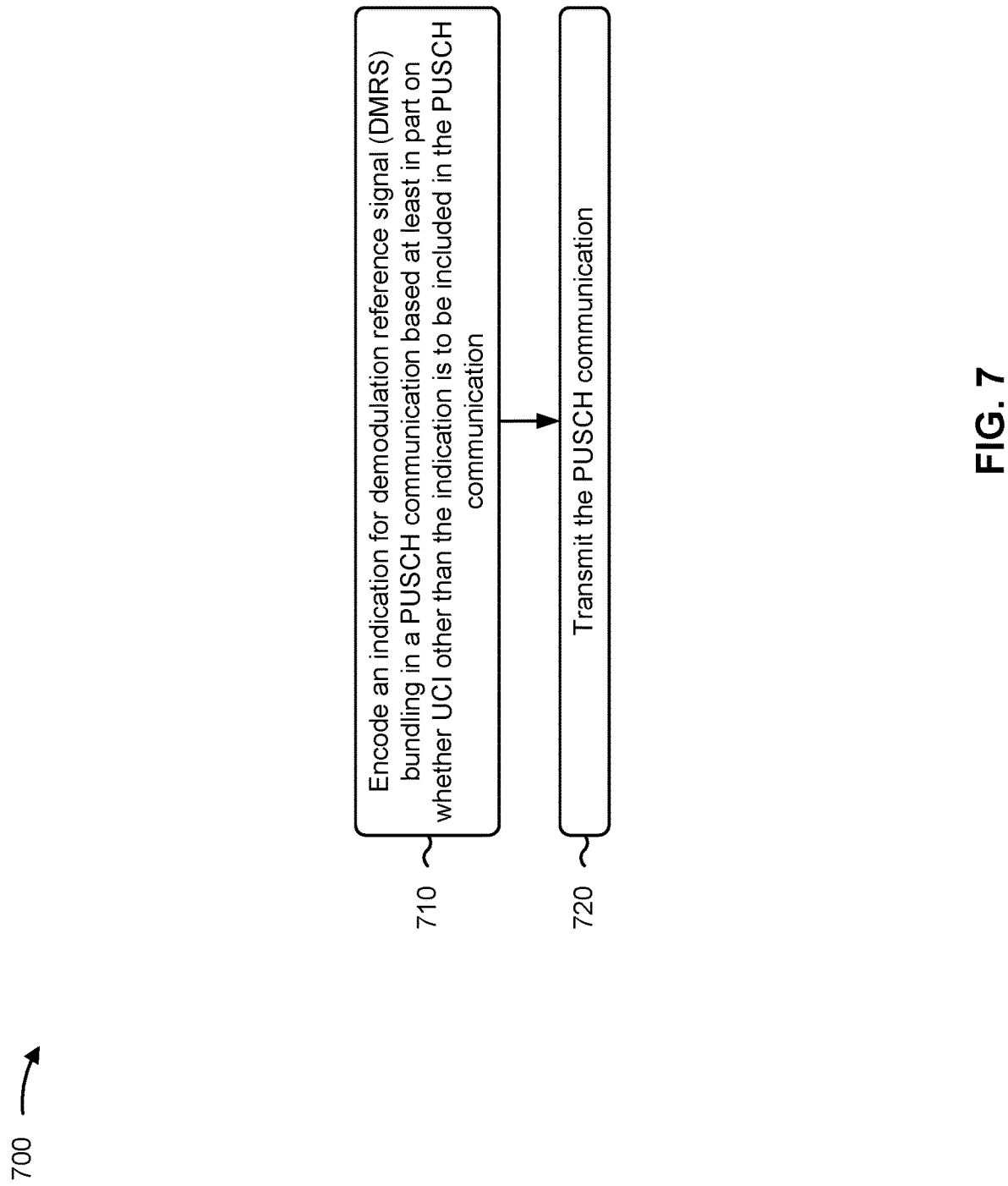
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1-2, UE 620 depicted in FIG. 6) performs operations associated with indicating DMRS bundling.

As shown in FIG. 7, in some aspects, process 700 may include encoding an indication for DMRS bundling in a PUSCH communication based at least in part on whether UCI other than the indication is to be included in the PUSCH communication (block 710). For example, the UE (e.g., using encoding component 1308 depicted in FIG. 13) may encode an indication for DMRS bundling in a PUSCH communication based at least in part on whether UCI other than the indication is to be included in the PUSCH communication, as described above.

As further shown in FIG. 7, in some aspects, process 700 may include transmitting the PUSCH communication (block 720). For example, the UE (e.g., using transmission component 1304 depicted in FIG. 13) may transmit the PUSCH communication, as described above.

Process 700 may include additional aspects, such as any single aspect or any combination of aspects described below and/or in connection with one or more other processes described elsewhere herein.

In a first aspect, the encoding includes separately encoding the indication and the UCI if the UCI is to be included in the PUSCH communication.

In a second aspect, alone or in combination with the first aspect, the encoding includes mapping the indication to the PUSCH communication before mapping the UCI to the PUSCH communication.

In a third aspect, alone or in combination with one or more of the first and second aspects, the encoding includes mapping the UCI to the PUSCH communication before mapping the indication to the PUSCH communication.

In a fourth aspect, alone or in combination with one or more of the first through third aspects, the UCI includes HARQ feedback, the encoding includes mapping the HARQ feedback to the PUSCH communication before mapping the indication to the PUSCH communication, and mapping the indication to the PUSCH communication before mapping CSI to the PUSCH communication.

In a fifth aspect, alone or in combination with one or more of the first through fourth aspects, the UCI includes HARQ feedback, and the encoding includes mapping, to the PUSCH communication, in order: the HARQ feedback, CSI part 1, the indication, and CSI part 2.

In a sixth aspect, alone or in combination with one or more of the first through fifth aspects, the UCI includes HARQ feedback, and the encoding includes jointly encoding the indication and the HARQ feedback.

In a seventh aspect, alone or in combination with one or more of the first through sixth aspects, process 700 includes encoding CSI in the PUSCH communication separately from jointly encoding the indication and the HARQ feedback.

In an eighth aspect, alone or in combination with one or more of the first through seventh aspects, the encoding includes encoding the indication in the PUSCH communication if the UCI is not to be included in the PUSCH communication, and encoding the UCI in the PUSCH communication without encoding the indication if the UCI is to be included in the PUSCH communication.

In a ninth aspect, alone or in combination with one or more of the first through eighth aspects, the encoding includes encoding the indication in the PUSCH communication based at least in part on one or more of a priority level of data of the PUSCH communication, a priority level of the UCI, or a priority level of the indication.

In a tenth aspect, alone or in combination with one or more of the first through ninth aspects, the priority level of the indication is equal to the priority level of data of the PUSCH communication.

In an eleventh aspect, alone or in combination with one or more of the first through tenth aspects, the UCI includes HARQ feedback, and the HARQ feedback is included in the PUSCH communication and the indication is not included in the PUSCH communication if a priority level of the indication is less than a priority level of the HARQ feedback.

In a twelfth aspect, alone or in combination with one or more of the first through eleventh aspects, the UCI includes HARQ feedback, and the HARQ feedback and the indication are included in the PUSCH communication if a priority level of the indication is equal to or greater than a priority level of the HARQ feedback.

In a thirteenth aspect, alone or in combination with one or more of the first through twelfth aspects, the HARQ feedback and the indication are jointly encoded in the PUSCH communication if the priority level of the indication is equal to the priority level of the HARQ feedback.

In a fourteenth aspect, alone or in combination with one or more of the first through thirteenth aspects, the HARQ feedback and the indication are separately encoded in the PUSCH communication if the priority level of the indication is greater than the priority level of the HARQ feedback.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
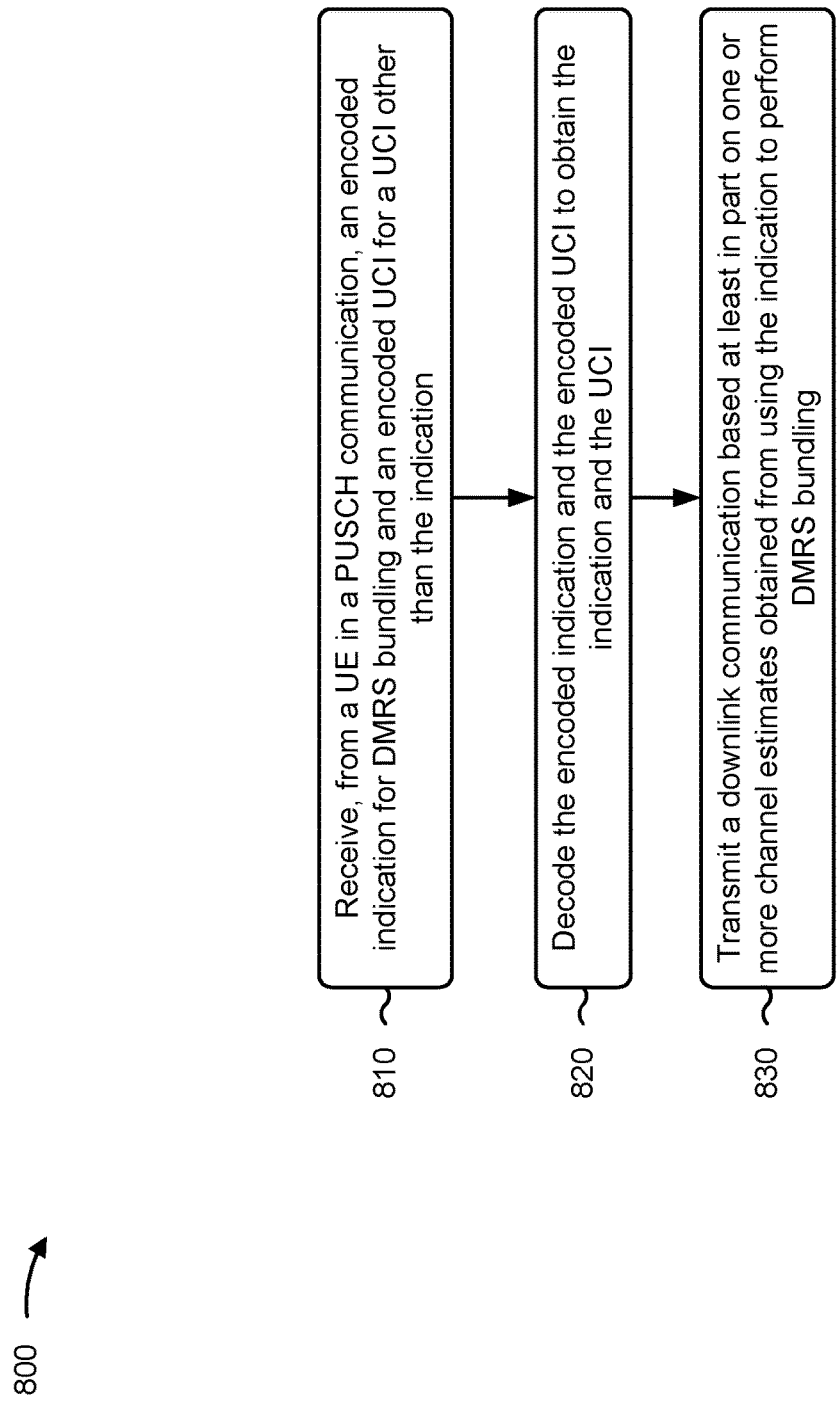
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 depicted in FIGS. 1-2, BS 610 depicted in FIG. 6) performs operations associated with indicating DMRS bundling.

As shown in FIG. 8, in some aspects, process 800 may include receiving, from a UE in a PUSCH communication, an encoded indication for DMRS bundling and an encoded UCI for a UCI other than the indication (block 810). For example, the base station (e.g., using reception component 1402 depicted in FIG. 14) may receive, from a UE in a PUSCH communication, an encoded indication for DMRS bundling and an encoded UCI for a UCI other than the indication, as described above.

As further shown in FIG. 8, in some aspects, process 800 may include decoding the encoded indication and the encoded UCI to obtain the indication and the UCI (block 820). For example, the base station (e.g., using decoding component 1408 depicted in FIG. 14) may decode the encoded indication and the encoded UCI to obtain the indication and the UCI, as described above.

As further shown in FIG. 8, in some aspects, process 800 may include transmitting a downlink communication based at least in part on one or more channel estimates obtained from using the indication to perform DMRS bundling (block 830). For example, the base station (e.g., using transmission component 1404 depicted in FIG. 14) may transmit a downlink communication based at least in part on one or more channel estimates obtained from using the indication to perform DMRS bundling, as described above.

Process 800 may include additional aspects, such as any single aspect or any combination of aspects described below and/or in connection with one or more other processes described elsewhere herein.

In a first aspect, the decoding includes decoding the encoded indication and the encoded UCI separately.

In a second aspect, alone or in combination with the first aspect, the decoding includes decoding the encoded indication and the encoded UCI jointly.

In a third aspect, alone or in combination with one or more of the first and second aspects, the UCI includes HARQ feedback.

In a fourth aspect, alone or in combination with one or more of the first through third aspects, process 800 includes separately decoding an encoded channel state information in the PUSCH communication.

In a fifth aspect, alone or in combination with one or more of the first through fourth aspects, the decoding includes performing channel estimation to obtain the encoded indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
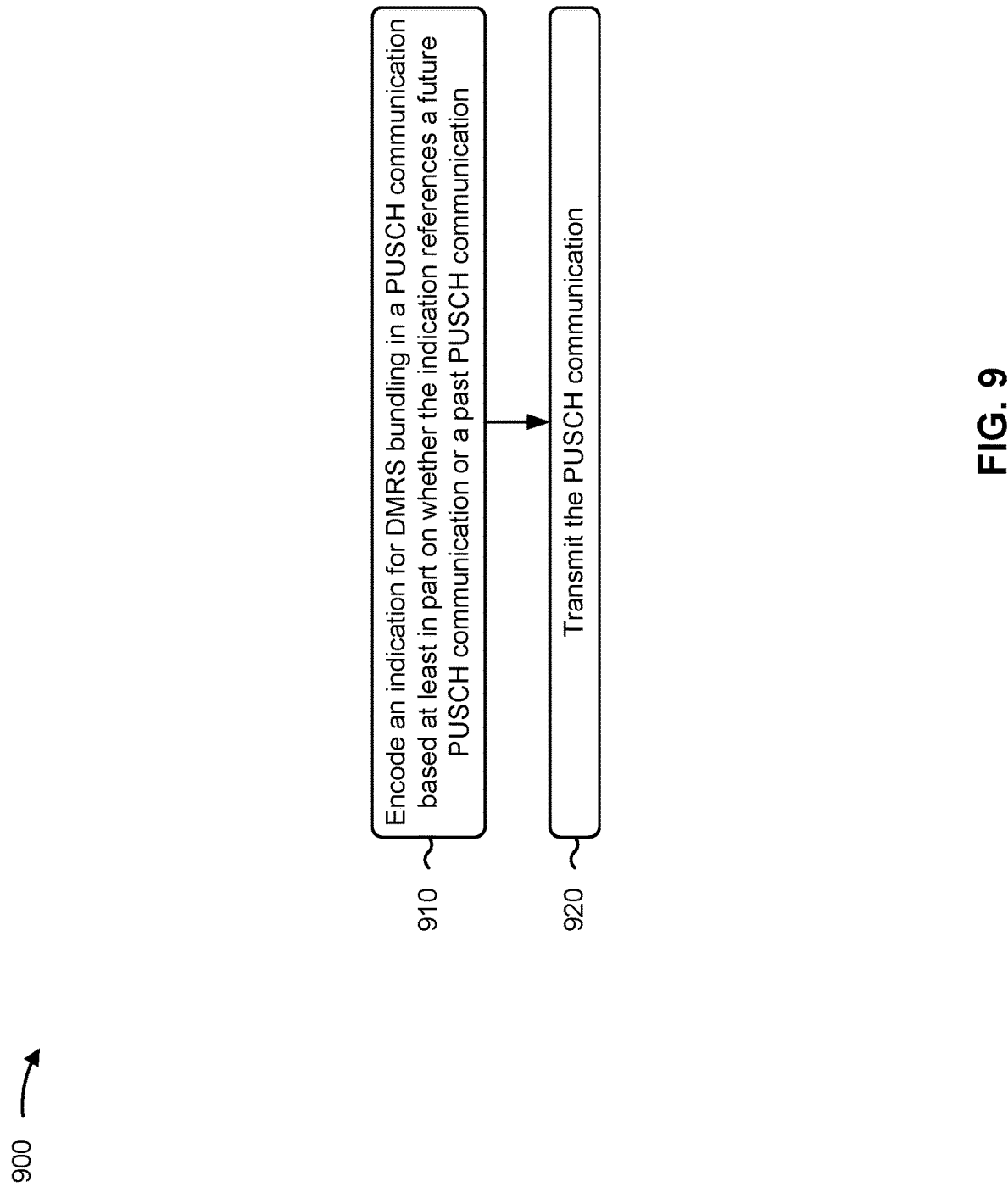
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120 depicted in FIGS. 1-2, UE 620 depicted in FIG. 6) performs operations associated with indicating DMRS bundling.

As shown in FIG. 9, in some aspects, process 900 may include encoding an indication for cross-slot channel estimation in a PUSCH communication based at least in part on whether the indication references a future PUSCH communication or a past PUSCH communication (block 910). For example, the UE (e.g., using encoding component 1508 depicted in FIG. 15) may encode an indication for DMRS bundling in a PUSCH communication based at least in part on whether the indication references a future PUSCH communication or a past PUSCH communication, as described above.

As further shown in FIG. 9, in some aspects, process 900 may include transmitting the PUSCH communication (block 920). For example, the UE (e.g., using transmission component 1504 depicted in FIG. 15) may transmit the PUSCH communication, as described above.

Process 900 may include additional aspects, such as any single aspect or any combination of aspects described below and/or in connection with one or more other processes described elsewhere herein.

In a first aspect, process 900 includes determining that the indication references a future PUSCH communication, where the encoding includes mapping the indication to an end of the PUSCH communication.

In a second aspect, alone or in combination with the first aspect, the encoding includes mapping the indication to at least a last symbol of the PUSCH communication.

In a third aspect, alone or in combination with one or more of the first and second aspects, process 900 includes determining that the indication references a past PUSCH communication, where the encoding includes mapping the indication to a start of the PUSCH communication.

In a fourth aspect, alone or in combination with one or more of the first through third aspects, the encoding includes mapping the indication to at least a first symbol of the PUSCH communication.

In a fifth aspect, alone or in combination with one or more of the first through fourth aspects, the encoding includes puncturing the PUSCH communication if the indication is separately encoded from other UCI.

In a sixth aspect, alone or in combination with one or more of the first through fifth aspects, the puncturing includes puncturing CSI in the PUSCH that is mapped to resource elements for the indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
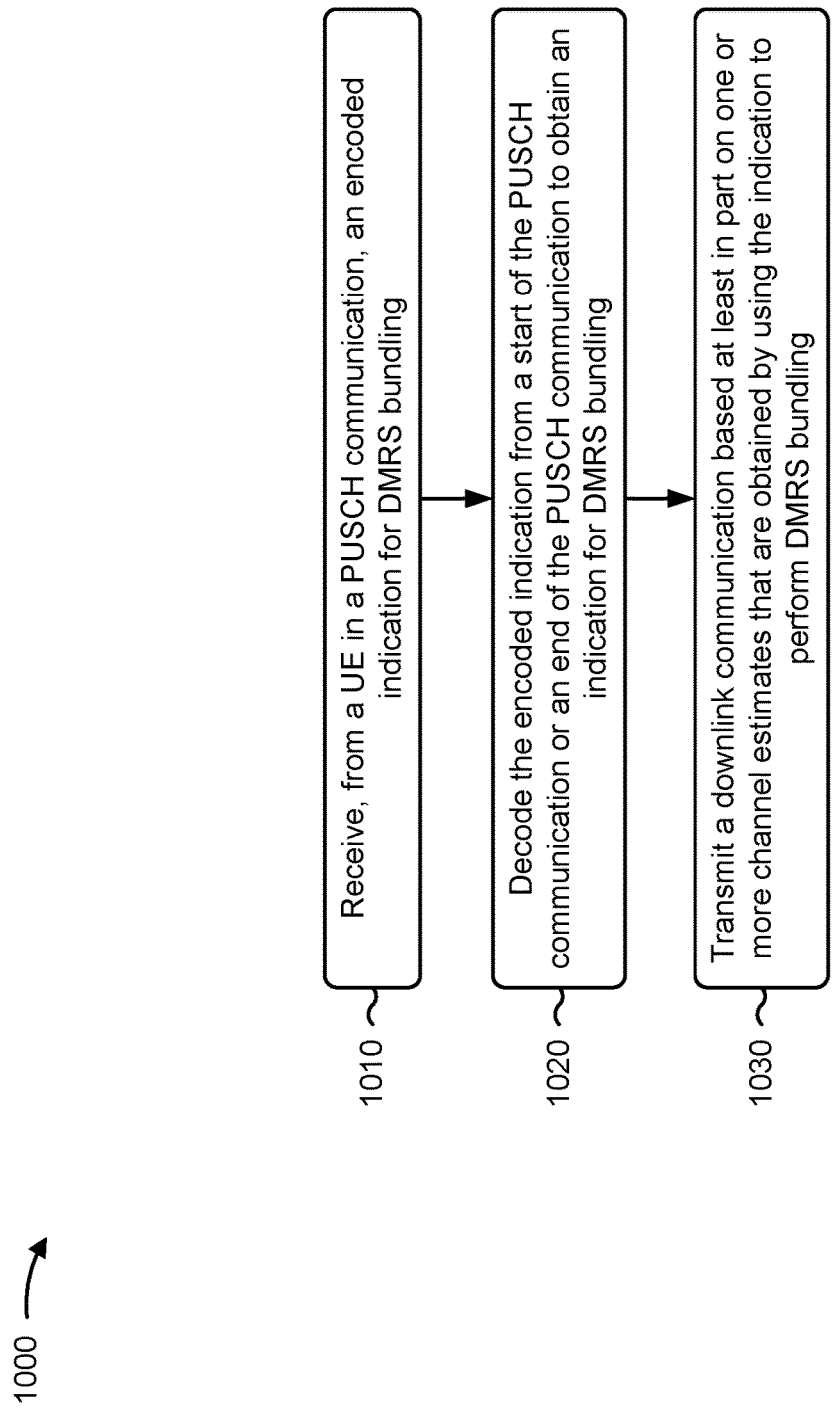
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 depicted in FIGS. 1-2, BS 610 depicted in FIG. 6) performs operations associated with indicating DMRS bundling.

As shown in FIG. 10, in some aspects, process 1000 may include receiving, from a UE in a PUSCH communication, an encoded indication for DMRS bundling (block 1010). For example, the base station (e.g., using reception component 1602 depicted in FIG. 16) may receive, from a UE in a PUSCH communication, an encoded indication for DMRS bundling, as described above.

As further shown in FIG. 10, in some aspects, process 1000 may include decoding the encoded indication from a start of the PUSCH communication or an end of the PUSCH communication to obtain an indication for DMRS bundling (block 1020). For example, the base station (e.g., using decoding component 1608 depicted in FIG. 16) may decode the encoded indication from a start of the PUSCH communication or an end of the PUSCH communication to obtain an indication for DMRS bundling, as described above.

As further shown in FIG. 10, in some aspects, process 1000 may include transmitting a downlink communication based at least in part on one or more channel estimates that are obtained by using the indication to perform DMRS bundling (block 1030). For example, the base station (e.g., using transmission component 1604 depicted in FIG. 16) may transmit a downlink communication based at least in part on one or more channel estimates that are obtained by using the indication to perform DMRS bundling, as described above.

Process 1000 may include additional aspects, such as any single aspect or any combination of aspects described below and/or in connection with one or more other processes described elsewhere herein.

In a first aspect, the decoding includes decoding the indication from at least a first symbol of the PUSCH communication, and where a past PUSCH communication is included in the DMRS bundling.

In a second aspect, alone or in combination with the first aspect, the decoding includes decoding the indication from at least a last symbol of the PUSCH communication, and where a future PUSCH communication is included in the DMRS bundling.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
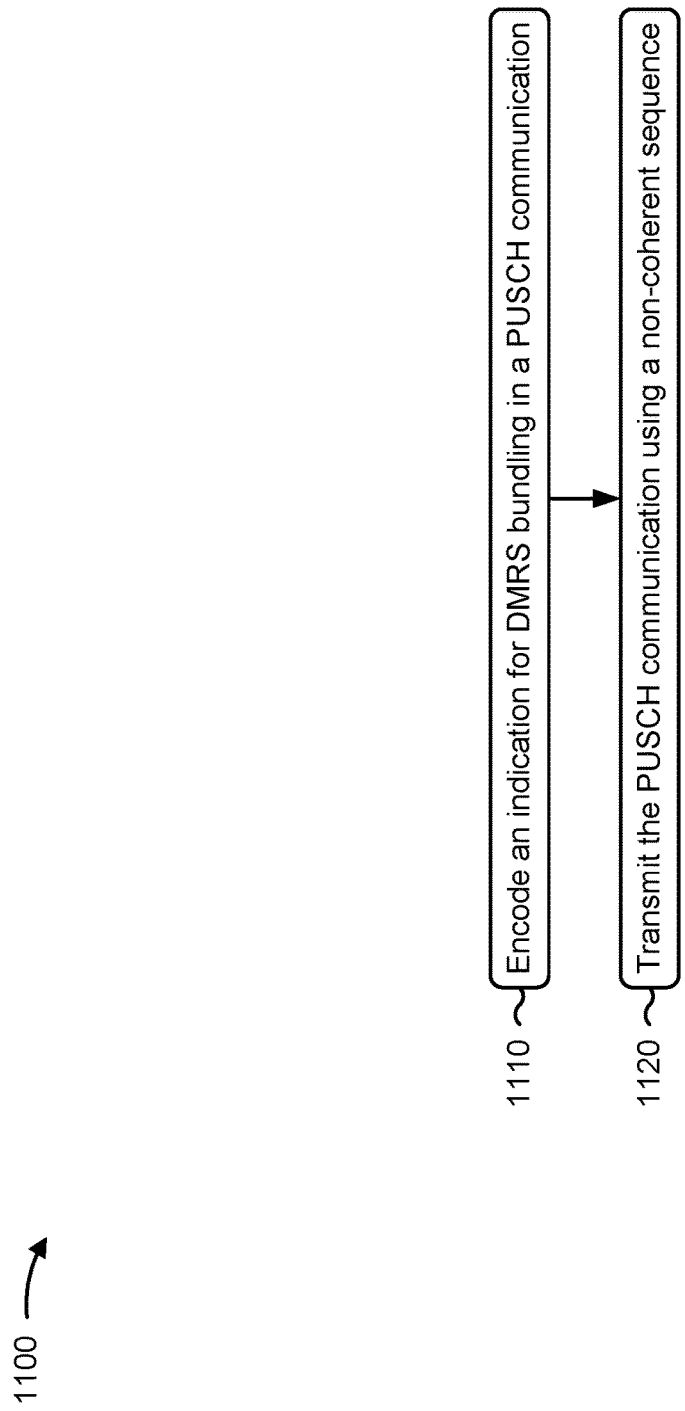
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 depicted in FIGS. 1-2, UE 620 depicted in FIG. 6) performs operations associated with indicating DMRS bundling.

As shown in FIG. 11, in some aspects, process 1100 may include encoding an indication for DMRS bundling in a PUSCH communication (block 1110). For example, the UE (e.g., using encoding component 1708 depicted in FIG. 17) may encode an indication for DMRS bundling in a PUSCH communication, as described above.

As further shown in FIG. 11, in some aspects, process 1100 may include transmitting the PUSCH communication using a non-coherent sequence (block 1120). For example, the UE (e.g., using transmission component 1704 depicted in FIG. 17) may transmit the PUSCH communication using a non-coherent sequence, as described above.

Process 1100 may include additional aspects, such as any single aspect or any combination of aspects described below and/or in connection with one or more other processes described elsewhere herein.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
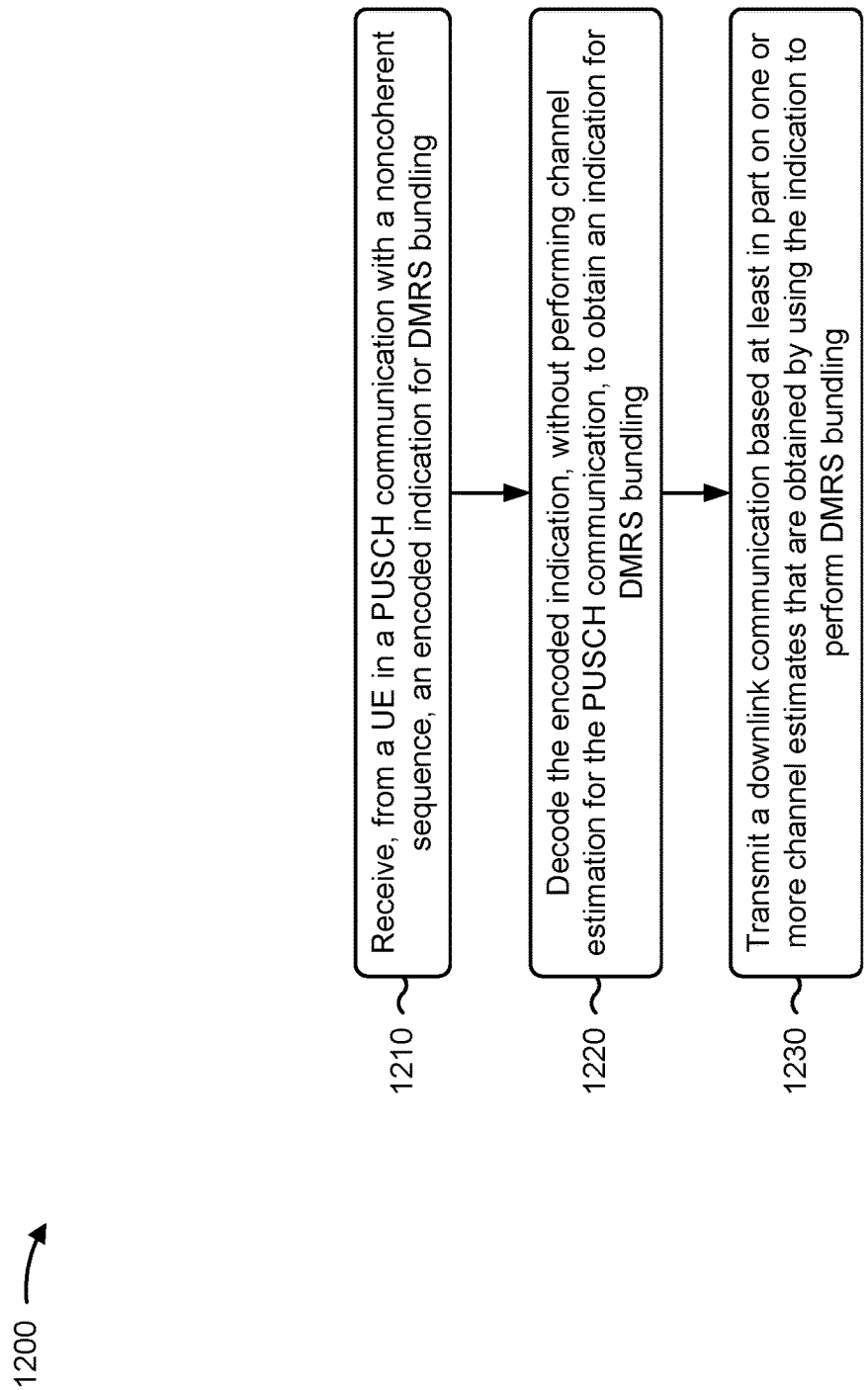
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 depicted in FIGS. 1-2, BS 610 depicted in FIG. 6) performs operations associated with indicating DMRS bundling.

As shown in FIG. 12, in some aspects, process 1200 may include receiving, from a UE in a PUSCH communication with a noncoherent sequence, an encoded indication for DMRS bundling (block 1210). For example, the base station (e.g., using reception component 1802 depicted in FIG. 18) may receive, from a UE in a PUSCH communication with a noncoherent sequence, an encoded indication for DMRS bundling, as described above.

As further shown in FIG. 12, in some aspects, process 1200 may include decoding the encoded indication, without performing channel estimation for the PUSCH communication, to obtain an indication for DMRS bundling (block 1220). For example, the base station (e.g., using decoding component 1808 depicted in FIG. 18) may decode the encoded indication, without performing channel estimation for the PUSCH communication, to obtain an indication for DMRS bundling, as described above.

As further shown in FIG. 12, in some aspects, process 1200 may include transmitting a downlink communication based at least in part on one or more channel estimates that are obtained by using the indication to perform DMRS bundling (block 1230). For example, the base station (e.g., using transmission component 1804 depicted in FIG. 18) may transmit a downlink communication based at least in part on one or more channel estimates that are obtained by using the indication to perform DMRS bundling, as described above.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
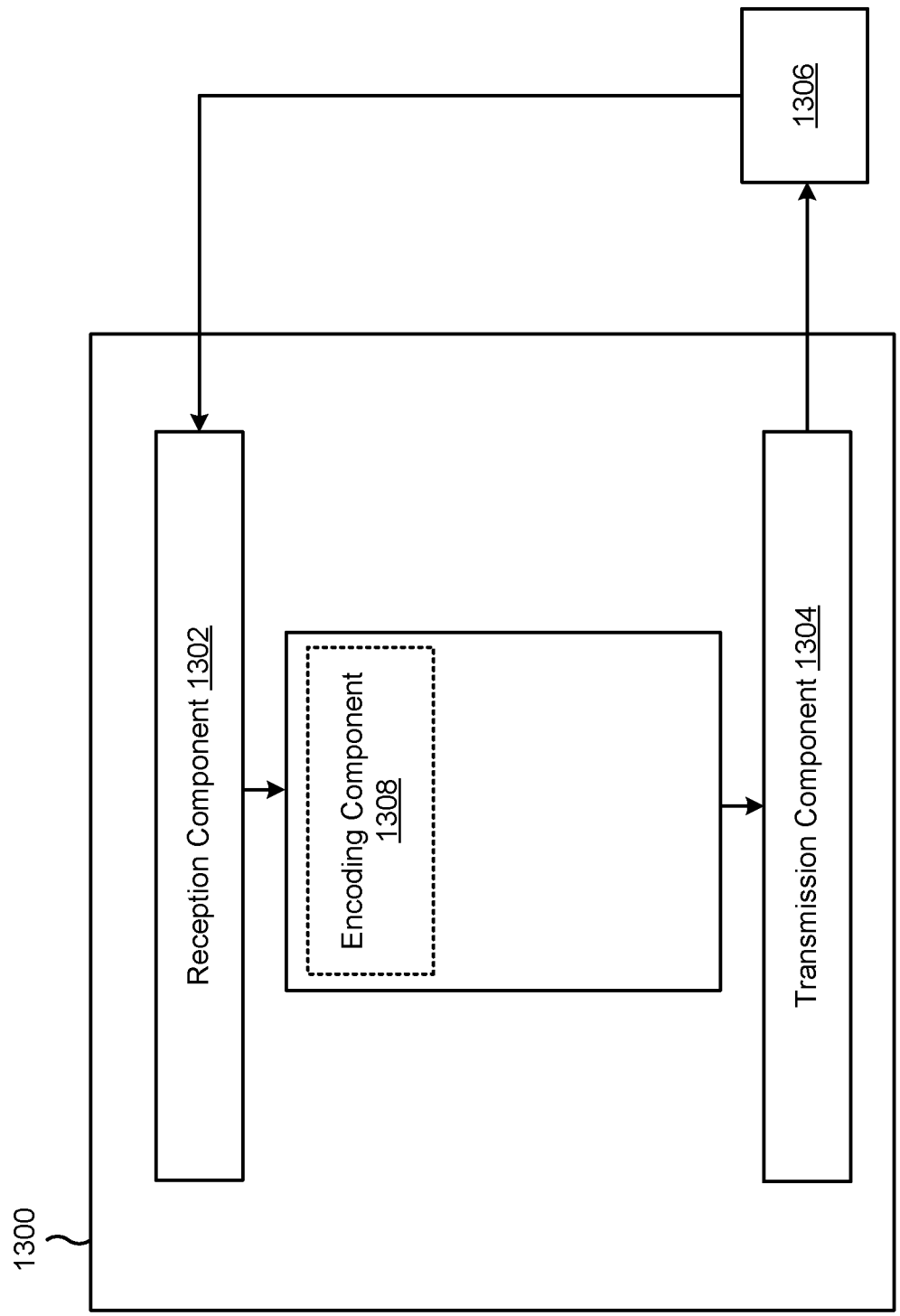
FIGS. 13-18 are block diagrams of example apparatuses for wireless communication, in accordance with the present disclosure.

FIG. 13 is a block diagram of an example apparatus 1300 for wireless communication. The apparatus 1300 may be a UE (e.g., a UE 120, UE 620), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include an encoding component 1308, among other examples.

In some aspects, the apparatus 1300 may be configured to perform one or more operations described herein in connection with FIGS. 1-6. Additionally, or alternatively, the apparatus 1300 may be configured to perform one or more processes described herein, such as process 700 of FIG. 7. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The encoding component 1308 may encode an indication for DMRS bundling in a PUSCH communication based at least in part on whether UCI other than the indication is to be included in the PUSCH communication. The transmission component 1304 may transmit the PUSCH communication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
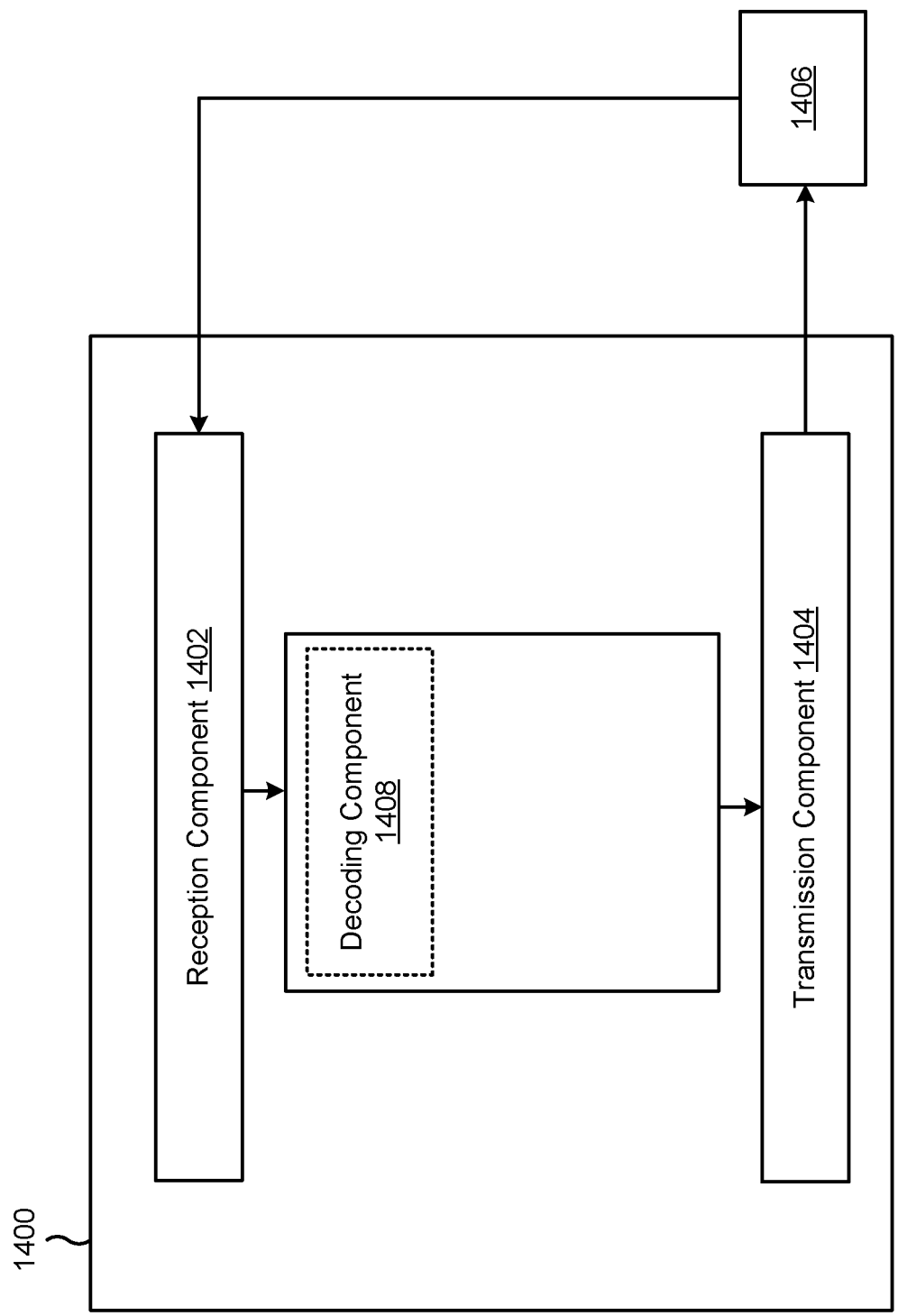

FIG. 14 is a block diagram of an example apparatus 1400 for wireless communication. The apparatus 1400 may be a base station (e.g., base station 110, BS 610), or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a decoding component 1408, among other examples.

In some aspects, the apparatus 1400 may be configured to perform one or more operations described herein in connection with FIGS. 1-6. Additionally, or alternatively, the apparatus 1400 may be configured to perform one or more processes described herein, such as process 800 of FIG. 8. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The reception component 1402 may receive, from a UE in a PUSCH communication, an encoded indication for DMRS bundling and an encoded UCI for a UCI other than the indication. The decoding component 1408 may decode the encoded indication and the encoded UCI to obtain the indication and the UCI. The transmission component 1404 may transmit a downlink communication based at least in part on one or more channel estimates obtained from using the indication to perform DMRS bundling. The decoding component 1408 may separately decode an encoded channel state information in the PUSCH communication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
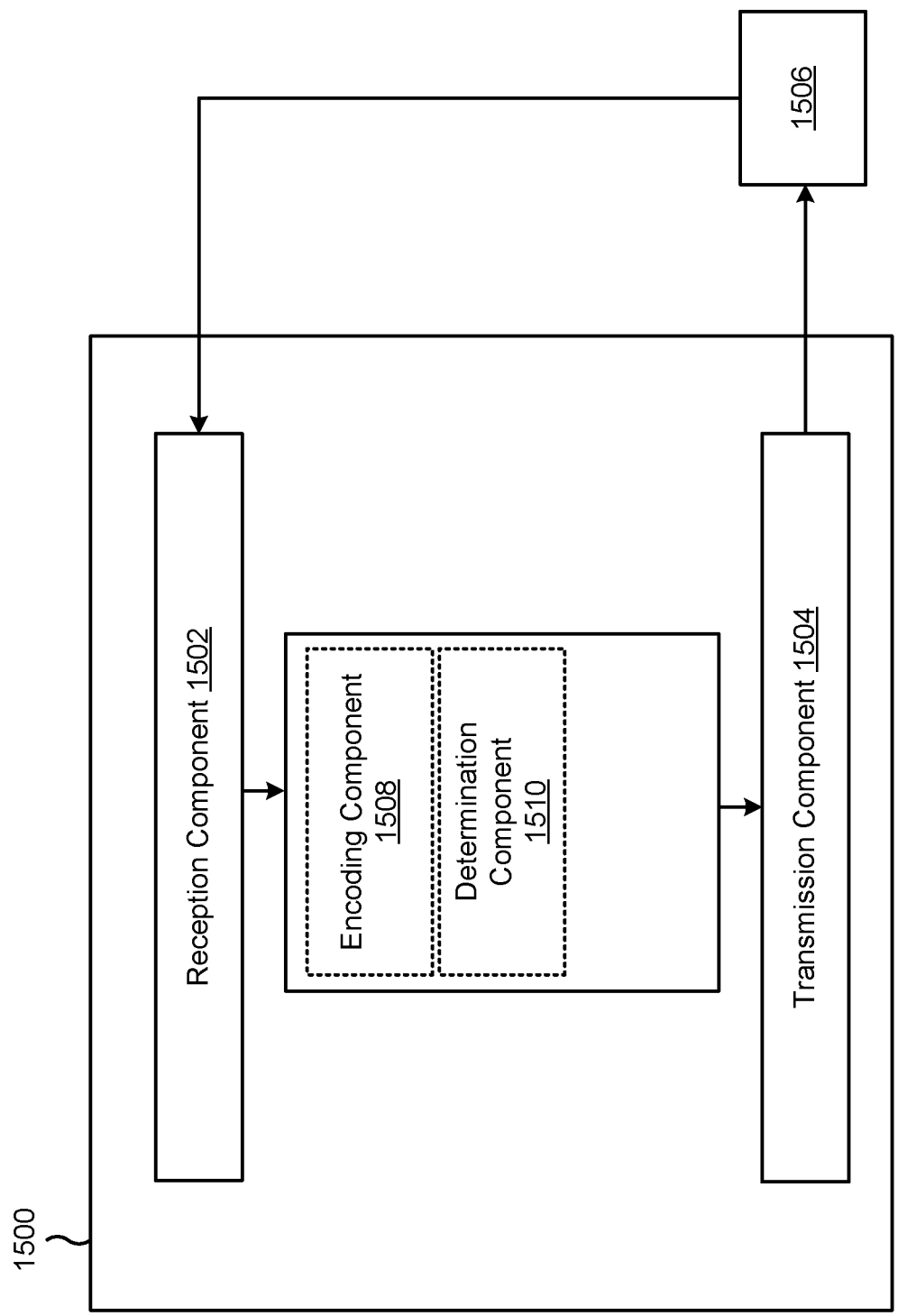

FIG. 15 is a block diagram of an example apparatus 1500 for wireless communication. The apparatus 1500 may be a UE (e.g., a UE 120, UE 620), or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include an encoding component 1508 and/or a determination component 1510, among other examples.

In some aspects, the apparatus 1500 may be configured to perform one or more operations described herein in connection with FIGS. 1-6. Additionally, or alternatively, the apparatus 1500 may be configured to perform one or more processes described herein, such as process 900 of FIG. 9. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The encoding component 1508 may encode an indication for DMRS bundling in a PUSCH communication based at least in part on whether the indication references a future PUSCH communication or a past PUSCH communication. The transmission component 1504 may transmit the PUSCH communication.

The determination component 1510 may determine that the indication references a future PUSCH communication, where the encoding component 1508 maps the indication to an end of the PUSCH communication. The determination component 1510 may determine that the indication references a past PUSCH communication, where the encoding component 1508 maps the indication to a start of the PUSCH communication.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
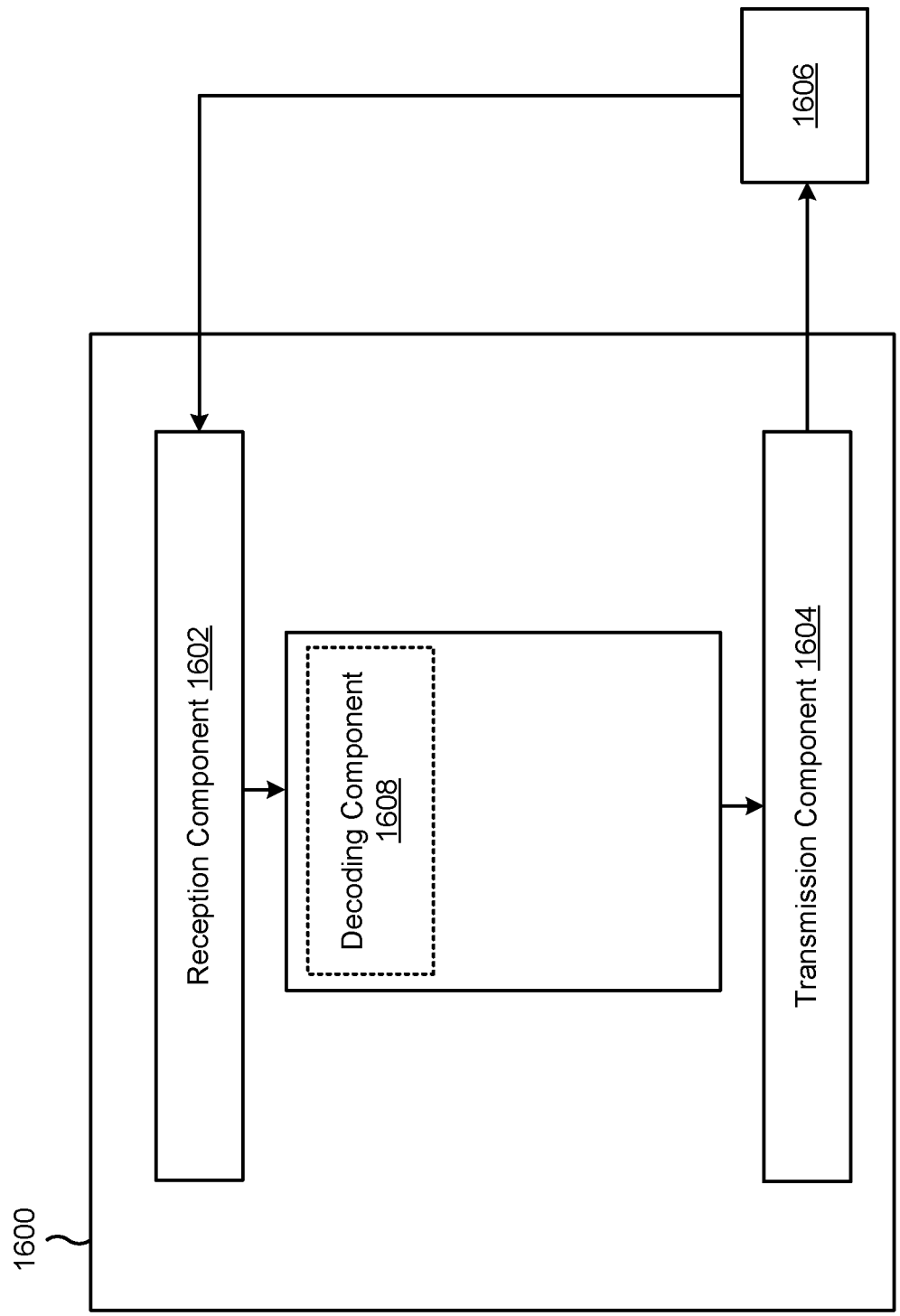

FIG. 16 is a block diagram of an example apparatus 1600 for wireless communication. The apparatus 1600 may be a base station (e.g., base station 110, Bs 610), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a decoding component 1608, among other examples.

In some aspects, the apparatus 1600 may be configured to perform one or more operations described herein in connection with FIGS. 1-6. Additionally, or alternatively, the apparatus 1600 may be configured to perform one or more processes described herein, such as process 1000 of FIG. 10. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The reception component 1602 may receive, from a UE in a PUSCH communication, an encoded indication for DMRS bundling. The decoding component 1608 may decode the encoded indication from a start of the PUSCH communication or an end of the PUSCH communication to obtain an indication for DMRS bundling. The transmission component 1604 may transmit a downlink communication based at least in part on one or more channel estimates that are obtained by using the indication to perform DMRS bundling.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
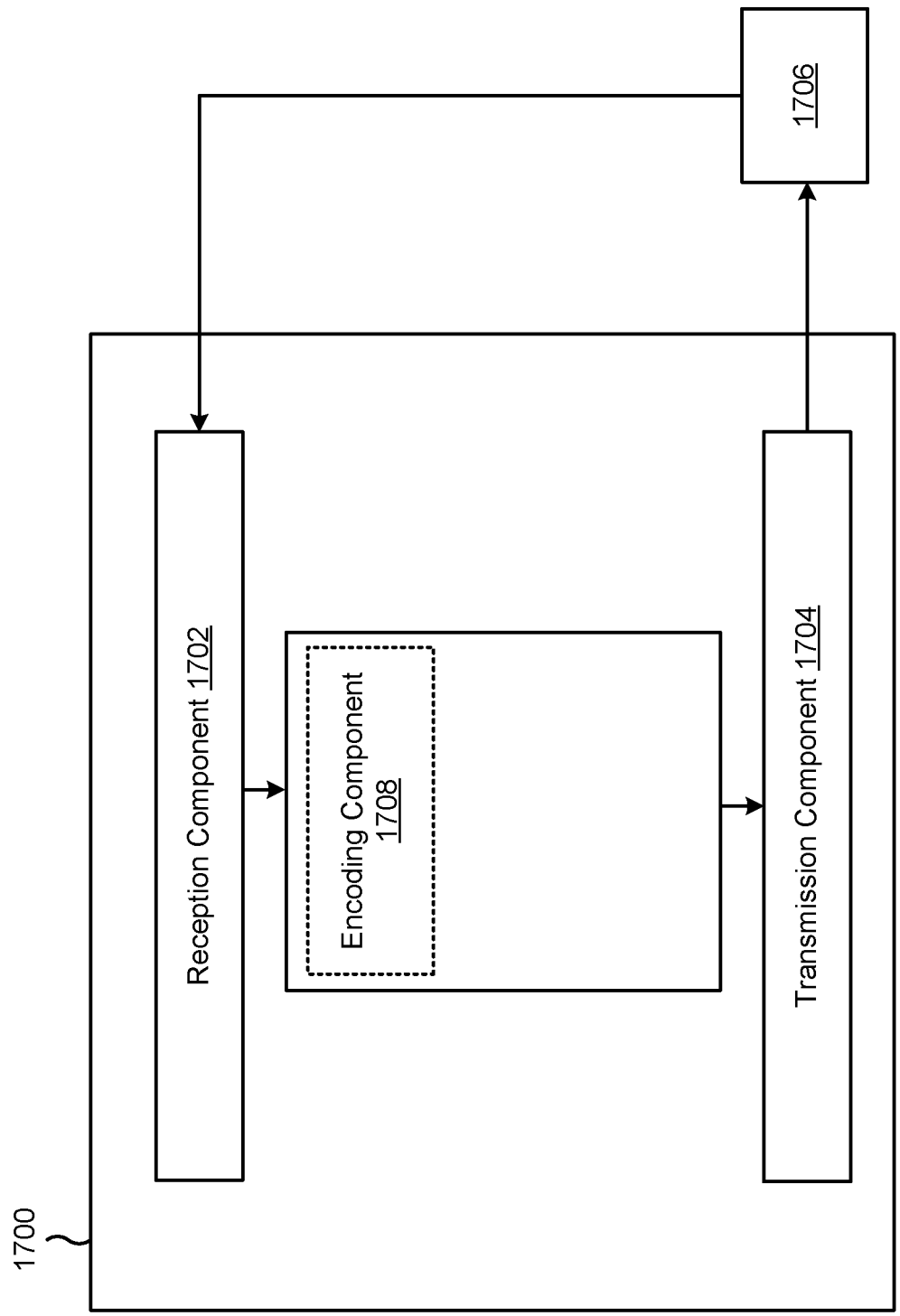

FIG. 17 is a block diagram of an example apparatus 1700 for wireless communication. The apparatus 1700 may be a UE (e.g., a UE 120, UE 620), or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include an encoding component 1708, among other examples.

In some aspects, the apparatus 1700 may be configured to perform one or more operations described herein in connection with FIGS. 1-6. Additionally, or alternatively, the apparatus 1700 may be configured to perform one or more processes described herein, such as process 1100 of FIG. 11. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The encoding component 1708 may encode an indication for DMRS bundling in a PUSCH communication. The transmission component 1704 may transmit the PUSCH communication using a non-coherent sequence.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
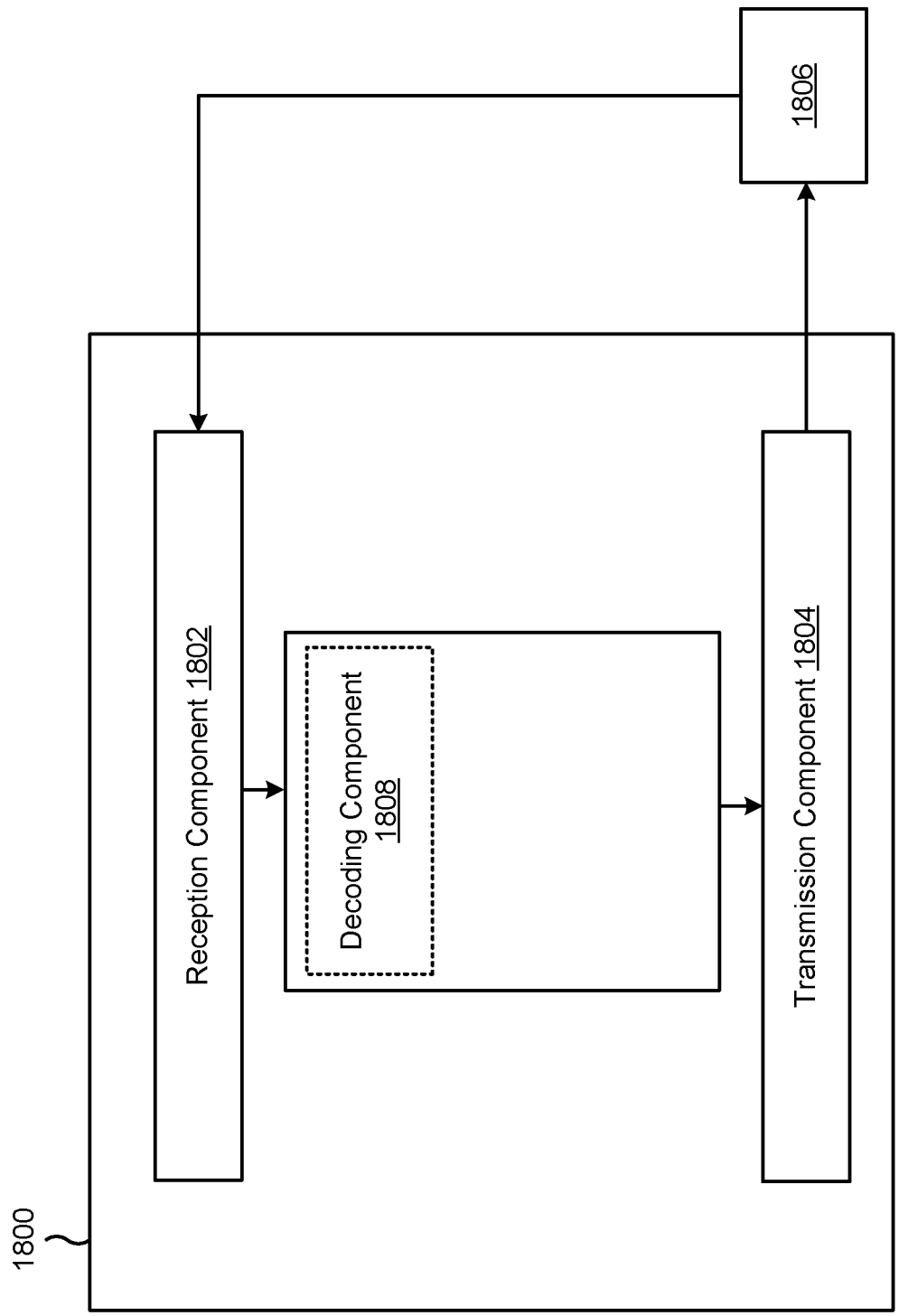

FIG. 18 is a block diagram of an example apparatus 1800 for wireless communication. The apparatus 1800 may be a base station (e.g., base station 110, BS 610), or a base station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a decoding component 1808, among other examples.

In some aspects, the apparatus 1800 may be configured to perform one or more operations described herein in connection with FIGS. 1-6. Additionally, or alternatively, the apparatus 1800 may be configured to perform one or more processes described herein, such as process 1200 of FIG. 12. In some aspects, the apparatus 1800 and/or one or more components shown in FIG. 18 may include one or more components of the base station described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the base station described above in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the base station described above in connection with FIG. 2. In some aspects, the transmission component 1804 may be co-located with the reception component 1802 in a transceiver.

The reception component 1802 may receive, from a UE in a PUSCH communication with a noncoherent sequence, an encoded indication for DMRS bundling. The decoding component 1808 may decode the encoded indication, without performing channel estimation for the PUSCH communication, to obtain an indication for DMRS bundling. The transmission component 1804 may transmit a downlink communication based at least in part on one or more channel estimates that are obtained by using the indication to perform DMRS bundling.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: encoding an indication for demodulation reference signal (DMRS) bundling in a physical uplink shared channel (PUSCH) communication based at least in part on whether uplink control information (UCI) other than the indication is to be included in the PUSCH communication; and transmitting the PUSCH communication.

Aspect 2: The method of Aspect 1, wherein the encoding includes separately encoding the indication and the UCI if the UCI is to be included in the PUSCH communication.

Aspect 3: The method of Aspect 2, wherein the encoding includes mapping the indication to the PUSCH communication before mapping the UCI to the PUSCH communication.

Aspect 4: The method of Aspect 2, wherein the encoding includes mapping the UCI to the PUSCH communication before mapping the indication to the PUSCH communication.

Aspect 5: The method of Aspect 2, wherein the UCI includes hybrid automatic repeat request (HARQ) feedback, and wherein the encoding includes mapping the HARQ feedback to the PUSCH communication before mapping the indication to the PUSCH communication, and mapping the indication to the PUSCH communication before mapping channel state information to the PUSCH communication.

Aspect 6: The method of Aspect 2, wherein the UCI includes hybrid automatic repeat request (HARQ) feedback, and wherein the encoding includes mapping, to the PUSCH communication, in order: the HARQ feedback, channel state information (CSI) part 1, the indication, and CSI part 2.

Aspect 7: The method of Aspect 1, wherein the UCI includes hybrid automatic repeat request (HARQ) feedback, and wherein the encoding includes jointly encoding the indication and the HARQ feedback.

Aspect 8: The method of Aspect 7, further comprising encoding channel state information in the PUSCH communication separately from jointly encoding the indication and the HARQ feedback.

Aspect 9: The method of any of Aspects 1-8, wherein the encoding includes: encoding the indication in the PUSCH communication if the UCI is not to be included in the PUSCH communication; and encoding the UCI in the PUSCH communication without encoding the indication if the UCI is to be included in the PUSCH communication.

Aspect 10: The method of any of Aspects 1-9, wherein the encoding includes encoding the indication in the PUSCH communication based at least in part on one or more of: a priority level of data of the PUSCH communication, a priority level of the UCI, or a priority level of the indication.

Aspect 11: The method of Aspect 10, wherein the priority level of the indication is equal to the priority level of data of the PUSCH communication.

Aspect 12: The method of Aspect 11, wherein the UCI includes hybrid automatic repeat request (HARQ) feedback, and wherein the HARQ feedback is included in the PUSCH communication and the indication is not included in the PUSCH communication if a priority level of the indication is less than a priority level of the HARQ feedback.

Aspect 13: The method of Aspect 11, wherein the UCI includes hybrid automatic repeat request (HARQ) feedback, and wherein the HARQ feedback and the indication are included in the PUSCH communication if a priority level of the indication is equal to or greater than a priority level of the HARQ feedback.

Aspect 14: The method of Aspect 13, wherein the HARQ feedback and the indication are jointly encoded in the PUSCH communication if the priority level of the indication is equal to the priority level of the HARQ feedback.

Aspect 15: The method of Aspect 13, wherein the HARQ feedback and the indication are separately encoded in the PUSCH communication if the priority level of the indication is greater than the priority level of the HARQ feedback.

Aspect 16: A method of wireless communication performed by a base station, comprising: receiving, from a user equipment (UE) in a physical uplink shared channel (PUSCH) communication, an encoded indication for DMRS bundling and an encoded uplink control information (UCI) for a UCI other than the indication; decoding the encoded indication and the encoded UCI to obtain the indication and the UCI; and transmitting a downlink communication based at least in part on one or more channel estimates obtained from using the indication to perform DMRS bundling.

Aspect 17: The method of Aspect 16, wherein the decoding includes decoding the encoded indication and the encoded UCI separately.

Aspect 18: The method of Aspect 16, wherein the decoding includes decoding the encoded indication and the encoded UCI jointly.

Aspect 19: The method of any of Aspects 16-18, wherein the UCI includes hybrid automatic repeat request (HARQ) feedback.

Aspect 20: The method of any of Aspects 16-19, further comprising separately decoding an encoded channel state information in the PUSCH communication.

Aspect 21: The method of any of Aspects 16-20, wherein the decoding includes performing channel estimation to obtain the encoded indication.

Aspect 22: A method of wireless communication performed by a user equipment (UE), comprising: encoding an indication for DMRS bundling in a physical uplink shared channel (PUSCH) communication based at least in part on whether the indication references a future PUSCH communication or a past PUSCH communication; and transmitting the PUSCH communication.

Aspect 23: The method of Aspect 22, further comprising determining that the indication references a future PUSCH communication, wherein the encoding includes mapping the indication to an end of the PUSCH communication.

Aspect 24: The method of Aspect 23, wherein the encoding includes mapping the indication to at least a last symbol of the PUSCH communication.

Aspect 25: The method of Aspect 22, further comprising determining that the indication references a past PUSCH communication, wherein the encoding includes mapping the indication to a start of the PUSCH communication.

Aspect 26: The method of Aspect 25, wherein the encoding includes mapping the indication to at least a first symbol of the PUSCH communication.

Aspect 27: The method of Aspect 22, wherein the encoding includes puncturing the PUSCH communication if the indication is separately encoded from other uplink control information.

Aspect 28: The method of Aspect 27, wherein the puncturing includes puncturing channel state information in the PUSCH that is mapped to resource elements for the indication.

Aspect 29: A method of wireless communication performed by a base station, comprising: receiving, from a user equipment (UE) in a physical uplink shared channel (PUSCH) communication, an encoded indication for demodulation reference signal (DMRS) bundling; decoding the encoded indication from a start of the PUSCH communication or an end of the PUSCH communication to obtain an indication for DMRS bundling; and transmitting a downlink communication based at least in part on one or more channel estimates that are obtained by using the indication to perform DMRS bundling.

Aspect 30: The method of Aspect 29, wherein the decoding includes decoding the indication from at least a first symbol of the PUSCH communication, and wherein a past PUSCH communication is included in the DMRS bundling.

Aspect 31: The method of Aspect 29, wherein the decoding includes decoding the indication from at least a last symbol of the PUSCH communication, and wherein a future PUSCH communication is included in the DMRS bundling.

Aspect 32: A method of wireless communication performed by a user equipment (UE), comprising: encoding an indication for DMRS bundling in a physical uplink shared channel (PUSCH) communication; and transmitting the PUSCH communication using a non-coherent sequence.

Aspect 33: A method of wireless communication performed by a base station, comprising: receiving, from a user equipment (UE) in a physical uplink shared channel (PUSCH) communication with a noncoherent sequence, an encoded indication for DMRS bundling; decoding the encoded indication, without performing channel estimation for the PUSCH communication, to obtain an indication for DMRS bundling; and transmitting a downlink communication based at least in part on one or more channel estimates that are obtained by using the indication to perform DMRS bundling.

Aspect 32: An apparatus for wireless communication at a device, comprising a processor; memory coupled with the processor; and instructions stored in the memory and executable by the processor to cause the apparatus to perform the method of one or more aspects of aspects 1-33.

Aspect 33: A device for wireless communication, comprising a memory and one or more processors coupled to the memory, the memory and the one or more processors configured to perform the method of one or more aspects of aspects 1-33.

Aspect 34: An apparatus for wireless communication, comprising at least one means for performing the method of one or more aspects of aspects 1-33.

Aspect 35: A non-transitory computer-readable medium storing code for wireless communication, the code comprising instructions executable by a processor to perform the method of one or more aspects of aspects 1-33.

Aspect 36: A non-transitory computer-readable medium storing a set of instructions for wireless communication, the set of instructions comprising one or more instructions that, when executed by one or more processors of a device, cause the device to perform the method of one or more aspects of aspects 1-33.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors individually or collectively coupled to the one or more memories, the one or more processors to cause the UE to:
encode an indication for demodulation reference signal (DMRS) bundling in a physical uplink shared channel (PUSCH) communication based at least in part on whether uplink control information (UCI) other than the indication is to be included in the PUSCH communication; and
transmit the PUSCH communication,
wherein the one or more processors, to encode the indication, are configured to at least one of:
separately encode the indication and the UCI if the UCI is to be included in the PUSCH communication,
jointly encode the indication and the UCI if the UCI includes hybrid automatic repeat request (HARQ) feedback,
encode the indication if the UCI is not to be included in the PUSCH communication,
encode the UCI in the PUSCH communication without encoding the indication if the UCI is to be included in the PUSCH communication, or
encode the indication based at least in part on one or more of: a priority level of data of the PUSCH communication, a priority level of the UCI, or a priority level of the indication.

2. The UE of claim 1, wherein the one or more processors, to encode the indication, are configured to separately encode the indication and the UCI if the UCI is to be included in the PUSCH communication.

3. The UE of claim 2, wherein the one or more processors, to encode the indication, are configured to map the indication to the PUSCH communication before mapping the UCI to the PUSCH communication.

4. The UE of claim 2, wherein the one or more processors, to encode the indication, are configured to map the UCI to the PUSCH communication before mapping the indication to the PUSCH communication.

5. The UE of claim 2, wherein the UCI includes the HARQ feedback, and wherein the one or more processors, to encode the indication, are configured to map the HARQ feedback to the PUSCH communication before mapping the indication to the PUSCH communication, and map the indication to the PUSCH communication before mapping channel state information to the PUSCH communication.

6. The UE of claim 2, wherein the UCI includes the HARQ feedback, and wherein the one or more processors, to encode the indication, are configured to map, to the PUSCH communication, in order: the HARQ feedback, channel state information (CSI) part 1, the indication, and CSI part 2.

7. The UE of claim 1, wherein the one or more processors, to encode the indication, are configured to jointly encode the indication and the UCI if the UCI includes the HARQ feedback.

8. The UE of claim 7, wherein the one or more processors are configured to encode channel state information in the PUSCH communication separately from jointly encoding the indication and the HARQ feedback.

9. The UE of claim 1, wherein the one or more processors, to encode the indication, are configured to:
encode the indication if the UCI is not to be included in the PUSCH communication; or
encode the UCI in the PUSCH communication without encoding the indication if the UCI is to be included in the PUSCH communication.

10. The UE of claim 1, wherein the one or more processors, to encode the indication, are configured to encode the indication in the PUSCH communication based at least in part on one or more of: the priority level of data of the PUSCH communication, the priority level of the UCI, or the priority level of the indication.

11. The UE of claim 10, wherein the priority level of the indication is equal to the priority level of data of the PUSCH communication.

12. The UE of claim 11, wherein the UCI includes the HARQ feedback, and wherein the HARQ feedback is included in the PUSCH communication and the indication is not included in the PUSCH communication if a priority level of the indication is less than a priority level of the HARQ feedback.

13. The UE of claim 11, wherein the UCI includes the HARQ feedback, and wherein the HARQ feedback and the indication are included in the PUSCH communication if a priority level of the indication is equal to or greater than a priority level of the HARQ feedback.

14. The UE of claim 13, wherein the HARQ feedback and the indication are jointly encoded in the PUSCH communication if the priority level of the indication is equal to the priority level of the HARQ feedback.

15. The UE of claim 13, wherein the HARQ feedback and the indication are separately encoded in the PUSCH communication if the priority level of the indication is greater than the priority level of the HARQ feedback.

16. A network node for wireless communication, comprising:
one or more memories; and
one or more processors individually or collectively coupled to the one or more memories, the one or more processors configured to:
receive, from a user equipment (UE) in a physical uplink shared channel (PUSCH) communication, an encoded indication for an indication for for demodulation reference signal (DMRS) bundling and an encoded uplink control information (UCI) for a UCI other than the indication;
decode the encoded indication and the encoded UCI to obtain the indication and the UCI; and
transmit a downlink communication based at least in part on one or more channel estimates obtained from using the indication to perform DMRS bundling,
wherein at least one of:
the one or more processors, to decode the encoded indication and the encoded UCI, are configured to:
decode the encoded indication and the encoded UCI separately or jointly, or
perform channel estimation to obtain the encoded indication,
the UCI includes hybrid automatic repeat request (HARQ) feedback, or
the one or more processors are further configured to separately decode an encoded channel state information in the PUSCH communication.

17. The network node of claim 16, wherein the one or more processors, to decode the encoded indication, are configured to decode the encoded indication and the encoded UCI separately.

18. The network node of claim 16, wherein the one or more processors, to decode the encoded indication, are configured to decode the encoded indication and the encoded UCI jointly.

19. The network node of claim 16, wherein the UCI includes the HARQ feedback.

20. The network node of claim 16, wherein the one or more processors are further configured to separately decode the encoded channel state information in the PUSCH communication.

21. The network node of claim 16, wherein the one or more processors, to decode the encoded indication, are configured to perform channel estimation to obtain the encoded indication.

22. A user equipment (UE) for wireless communication, comprising:
one or more memories; and
one or more processors individually or collectively coupled to the one or more memories, the one or more processors configured to:
encode an indication for demodulation reference signal (DMRS) bundling in a physical uplink shared channel (PUSCH) communication based at least in part on whether the indication references a future PUSCH communication or a past PUSCH communication; and
transmit the PUSCH communication,
wherein the one or more processors, to encode the indication, are configured to at least one of:
map the indication to an end of the PUSCH communication if the indication references a future PUSCH communication,
map the indication to a start of the PUSCH communication if the indication references a past PUSCH communication, or
puncture the PUSCH communication if the indication is separately encoded from other uplink control information.

23. The UE of claim 22, wherein the one or more processors are configured to determine that the indication references the future PUSCH communication, and wherein the one or more processors, to encode the indication, are configured to map the indication to the end of the PUSCH communication.

24. The UE of claim 23, wherein the one or more processors, to encode the indication, are configured to map the indication to at least a last symbol of the PUSCH communication.

25. The UE of claim 22, wherein the one or more processors are configured to determine that the indication references the past PUSCH communication, and wherein the one or more processors, to encode the indication, are configured to map the indication to the start of the PUSCH communication.

26. The UE of claim 25, wherein the one or more processors, to encode the indication, are configured to map the indication to at least a first symbol of the PUSCH communication.

27. The UE of claim 22, wherein the one or more processors, to encode the indication, are configured to puncture the PUSCH communication if the indication is separately encoded from other uplink control information.

28. The UE of claim 27, wherein the one or more processors, to puncture the PUSCH communication, are configured to puncture channel state information in the PUSCH that is mapped to resource elements for the indication.

29. A user equipment (UE) for wireless communication, comprising:
one or more memories; and
one or more processors individually or collectively coupled to the one or more memories, the one or more processors configured to:
encode an indication for demodulation reference signal (DMRS) bundling in a physical uplink shared channel (PUSCH) communication based at least in part on one or more of: a priority level of data of the PUSCH communication or a priority level of the indication; and
transmit the PUSCH communication using a non-coherent sequence.

* * * * *